United States Patent
Moorthy et al.

(10) Patent No.: US 11,750,821 B2
(45) Date of Patent: Sep. 5, 2023

(54) TECHNIQUES FOR GENERATING PER-TITLE ENCODING LADDERS

(71) Applicant: NETFLIX, INC., Los Gatos, CA (US)

(72) Inventors: Anush Moorthy, Redwood City, CA (US); Zhi Li, Mountain View, CA (US); Liwei Guo, San Francisco, CA (US); Aditya Mavlankar, San Francisco, CA (US); Anne Aaron, Menlo Park, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/174,121

(22) Filed: Feb. 11, 2021

(65) Prior Publication Data

US 2022/0256168 A1   Aug. 11, 2022

(51) Int. Cl.
  *H04N 19/146*   (2014.01)
  *H04N 19/154*   (2014.01)
  *H04N 19/184*   (2014.01)
  *H04N 19/30*    (2014.01)

(52) U.S. Cl.
  CPC ......... *H04N 19/146* (2014.11); *H04N 19/154* (2014.11); *H04N 19/184* (2014.11); *H04N 19/30* (2014.11)

(58) Field of Classification Search
  None
  See application file for complete search history.

(56) References Cited

U.S. PATENT DOCUMENTS

| | | | |
|---|---|---|---|
| 11,115,697 B1* | 9/2021 | Nandakumar | H04L 41/0823 |
| 2018/0302456 A1* | 10/2018 | Katsavounidis | H04L 65/70 |
| 2019/0379895 A1 | 12/2019 | Katsavounidis et al. | |
| 2020/0169592 A1 | 5/2020 | Katsavounidis | |
| 2020/0296362 A1* | 9/2020 | Chadwick | G06V 10/764 |

OTHER PUBLICATIONS

International Search Report for Application No. PCT/US2022/015455 dated Apr. 25, 2022.
Netflix Technology Blog, "Per-Title Encode Optimization", URL:https://netflixtechblog.com/per-title-encodeoptimization-7e99442b62a2, Dec. 14, 2015, 14 pages.
Katsenou et al., "Efficient Bitrate Ladder Construction for Content-Optimized Adaptive Video Streaming", URL:https://arxiv.org/pdf/2102.04550.pdf, Feb. 8, 2021, pp. 1-15.

\* cited by examiner

*Primary Examiner* — Samuel D Fereja
(74) *Attorney, Agent, or Firm* — Artegis Law Group, LLP

(57) ABSTRACT

In various embodiments, an encoding ladder application generates encoding ladders for encoding media titles. In operation, the encoding ladder application generates a first convex hull representing encoding tradeoffs between quality and bitrate when encoding a media title at a first resolution; The encoding ladder application generates a second convex hull representing encoding tradeoffs between quality and bitrate when encoding the media title at a second resolution. Based on the first convex hull and the second convex hull, the encoding ladder application generates an overall convex hull. Subsequently, the encoding ladder application generates an encoding ladder for the media title based on at least the overall convex hull and a ladder requirement. Advantageously, the tradeoffs between quality and bitrate represented by the encoding ladder are customized for the media title. Consequently, encoding inefficiencies attributable to conventional fixed-bitrate ladders can be reduced.

20 Claims, 6 Drawing Sheets

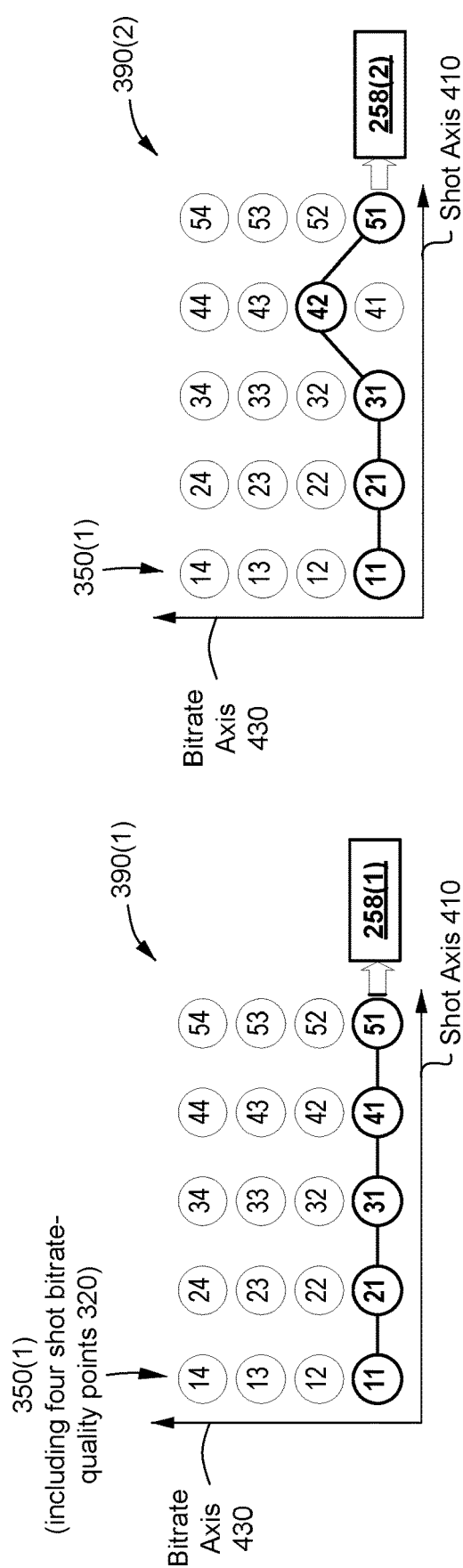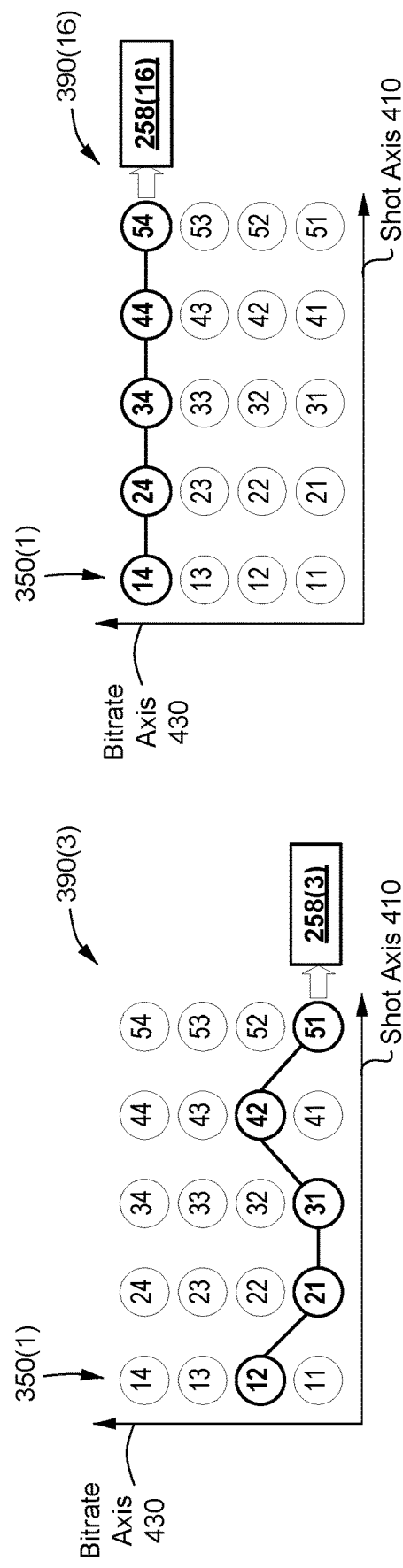

TECHNIQUES FOR GENERATING PER-TITLE ENCODING LADDERS

BACKGROUND

Field of the Various Embodiments

The various embodiments relate generally to computer science and processing media data and, more specifically, to techniques for generating per-title encoding ladders.

Description of the Related Art

A typical video streaming service provides users with access to a library of media titles that can be viewed on a range of different client devices. In operation, a given client device connects to the video streaming service under a variety of connection conditions and, therefore, can be susceptible to differing available network bandwidths. In an effort to ensure that a given media title can be streamed to a client device without playback interruptions, irrespective of the available network bandwidth, a video streaming service typically pre-generates multiple different encodings of the media title. "Lower-quality" encodings usually are streamed to the client device when the available network bandwidth is relatively low, and "higher-quality" encodings usually are streamed to the client device when the available network bandwidth is relatively high.

To pre-generate the different encodings of a given media title, a video streaming service typically encodes a corresponding source video at multiple combinations of bitrate and resolution or "bitrate-resolution pairs" specified in an encoding ladder. Each bitrate-resolution pair in the encoding ladder usually has a different bitrate, and the corresponding encoding video can be streamed to a client device with reduced playback interruption when the available network bandwidth is greater than or equal to that bitrate.

To playback a given media title on a client device, an endpoint application can be executed on the client device that selects the different encoded videos generated for the media title based, at least in part, on the available network bandwidth. When a given encoded video is selected by the endpoint application, one or more discrete portions or "chunks" of the selected encoded video are streamed to the client device for playback. Upon receiving a chunk of a selected encoded video, the endpoint application decodes the chunk and then optionally resamples the resulting decoded chunk to generate a corresponding chunk of reconstructed video having the same resolution as the client device display. The endpoint application causes the different chunks of reconstructed video to be played back on the client device to effect playback of the media title.

As a general matter, information is eliminated from the source video of a media title when the source video is encoded to generate the different video encodings of the media title. Consequently, the visual quality of a given chunk of reconstructed video is usually lower than the visual quality of the corresponding chunk of source video, meaning that the chunk of reconstructed video contains relatively more visual quality impairments or artifacts than the corresponding chunk of source video. Further, the visual quality of a given chunk of reconstructed video typically decreases as the bitrate used to encode the corresponding chunk of source video decreases.

In one approach to generating an encoding ladder, the source videos corresponding to a variety of media titles are encoded at numerous bitrate-resolution pairs to generate multiple encoded videos for each media title. Reconstructed videos are then generated from the different encoded videos. Subsequently, various tradeoffs between the bitrates of the encoded videos and the visual quality levels of the reconstructed videos corresponding to the encoded videos are evaluated. Based on these bitrate-quality tradeoffs, a relatively small number of bitrate-resolution pairs are selected for inclusion in an encoding ladder, where each bitrate-resolution pair corresponds to a different bitrate. The resulting encoding ladder is known as a "fixed-bitrate ladder" and is used to generate the encoded videos for all media titles included in a given library of media titles.

One drawback of using a fixed-bitrate ladder is that, because the complexity of the video content included in different source videos can vary substantially, the tradeoffs between bitrate and visual quality represented by the fixed-bitrate ladder can be suboptimal for some source videos. In such cases, encoding using the fixed-bitrate ladder can result in encoding and transmission inefficiencies. For example, the bitrates of any number of the bitrate-resolution pairs in the fixed-bitrate ladder could exceed the bitrate at which visual quality saturation occurs for a given low-complexity source video. Upon reaching such a "quality saturation bitrate," increasing the number of bits used to encode the source video does not perceptibly increase the visual quality of the corresponding reconstructed video. Accordingly, encoding a source video at a bitrate that exceeds the quality saturation bitrate can waste computational resources, and streaming the resulting encoded video to a client device can consume network bandwidth unnecessarily. In another example, for any number of source videos, the resolutions of any number of the bitrate-resolution pairs in the fixed-bitrate ladder can be suboptimal with respect to visual quality. For example, a given bitrate-resolution pair in the fixed-bitrate ladder could specify a bitrate of 5000 kbps and a resolution of 3840×2160. For a given high-complexity source video, the visual quality associated with a "ladder" encoded video corresponding to that bitrate-resolution pair (i.e., 5000 kbps and 3840×2160) could be lower than the visual quality of a "non-ladder" encoded video that is generated at the same bitrate (5000 kpbs) and a lower resolution (e.g., 1920× 1080). For the bitrate of 5000 kbps, the visual quality associated with the ladder encoded video could therefore be unnecessarily low.

As the foregoing illustrates, what is needed in the art are more effective techniques for generating encoding ladders for encoding source videos.

SUMMARY

One embodiment of the present invention sets forth a computer-implemented method for generating encoding ladders for encoding media titles. The method includes generating a first convex hull representing encoding tradeoffs between quality and bitrate when encoding a media title at a first resolution; generating a second convex hull representing encoding tradeoffs between quality and bitrate when encoding the media title at a second resolution; determining an overall convex hull based on the first convex hull and the second convex hull; and generating an encoding ladder for the media title based on at least the overall convex hull and a first ladder requirement.

At least one technical advantage of the disclosed techniques relative to the prior art is that a different encoding ladder is automatically generated for each media title included in a given library of media titles based on the complexity of each shot included in the source video corresponding to that media title. Accordingly, with the disclosed techniques, the tradeoffs between bitrate and visual quality represented by each encoding ladder are customized for a given media title. Consequently, the encoding inefficiencies attributable to conventional fixed-bitrate ladders can be reduced. In particular, the disclosed techniques ensure that none of the bitrates specified in a given encoding ladder exceed the quality saturation bitrate of the corresponding source video and that the resolutions of any number of bitrate-resolution pairs in a given encoding ladder are properly optimized with respect to visual quality. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIGS. 4A-4D illustrate how the trellis iterator of FIG. 3 generates a convex hull based on ranked shot datasets, according to various embodiments;

DETAILED DESCRIPTION

Figure 1:
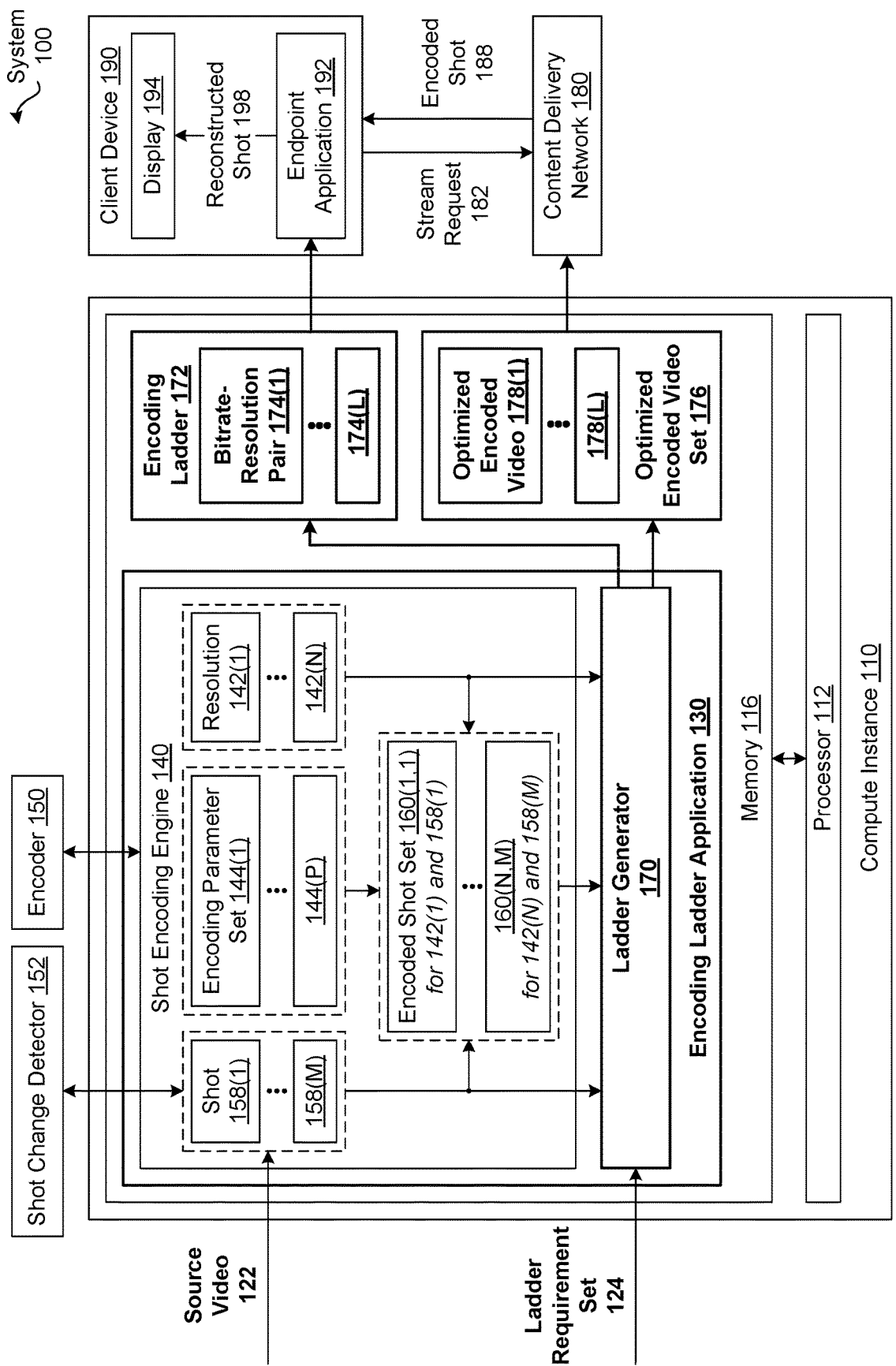
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

In an effort to ensure that a given media title can be streamed to a client device without playback interruptions, under a wide range of network bandwidths, a video streaming service typically pre-generates a set of encoded videos based on a source video corresponding to the media title. Each of the encoded videos corresponds to a different bitrate-resolution pair in an encoding ladder and can be streamed to a client device with reduced playback interruption when the available network bandwidth is greater than or equal to the bitrate specified in that bitrate-resolution pair.

To playback a given media title on a client device, an endpoint application can be executed on the client device that selects the bitrate-resolution pairs from the encoding ladder based on the available network bandwidth and optionally the resolution of the client device display. When a given bitrate-resolution pair is selected by the endpoint application, one or more chunks of the encoded video corresponding to the bitrate-resolution pair are streamed to the client device for playback. Upon receiving a chunk of a selected encoded video, the endpoint application decodes the chunk and then optionally resamples the resulting decoded chunk to generate a corresponding chunk of reconstructed video having the same resolution as the client device display. The endpoint application causes the different chunks of reconstructed video to be played back on the client device to effect playback of the media title.

Because information is eliminated from the source video when the source video is encoded to generate each of the encoded videos, the visual quality of a given chunk of reconstructed video is usually lower than the visual quality of the corresponding chunk of source video. Further, the visual quality of a given chunk of reconstructed video typically decreases as the bitrate of the corresponding encoded video decreases.

In one approach to generating an encoding ladder, the source videos corresponding to a variety of media titles are encoded at numerous bitrate-resolution pairs to generate multiple encoded videos for each media title. Various tradeoffs between the bitrates of the encoded videos and the visual quality levels of the reconstructed videos corresponding to the encoded videos are evaluated. Based on these bitrate-quality tradeoffs, a relatively small number of bitrate-resolution pairs are selected for inclusion in an encoding ladder, where each bitrate-resolution pair corresponds to a different bitrate. The resulting encoding ladder is known as a "fixed-bitrate ladder" and is used to generate the encoded videos for all media titles included in a given library of media titles.

One drawback of using a fixed-bitrate ladder is that, because the complexity of the video content included in different source videos can vary substantially, the tradeoffs between bitrate and visual quality represented by the fixed-bitrate ladder can be suboptimal for some source videos. In such cases, encoding using the fixed-bitrate ladder can result in encoding and transmission inefficiencies. For example, with a given codec format, a given low-complexity video could have a quality saturation bitrate of 800 kbps, meaning that increasing the bitrate used to encode the source video beyond 800 kbps would not perceptibly increase the visual quality of the corresponding reconstructed video. Further, multiple bitrate-resolution points in the fixed-bitrate ladder could have bitrates greater than 800 kbps. Encoding the source video based on these bitrate-resolution points would therefore waste computational resources and streaming the resulting encoded videos to a client device would consume network bandwidth unnecessarily. In addition, the aggregate size of the encoded videos would be unnecessarily large and therefore the amount of memory used to store the encoded videos would be bloated wherever (e.g., different geographical locations) the encoded videos were stored. In another example, as per the fixed-bitrate ladder, a given high-complexity source video could be encoded at a bitrate-resolution point of 5000 kbps and 3840×2160. If, however, the source video was encoded at the same bitrate but a lower resolution of 1920×1080, then the visual quality of the corresponding reconstructed video would be higher. But because only the encoded videos corresponding to the fixed-bitrate ladder could be selected by the endpoint application, the visual quality of the reconstructed video played back on the client device for the bitrate of 5000 kbps would be unnecessarily low.

With the disclosed techniques, however, an encoding ladder application generates a different encoding ladder for each media title based on the complexity of each shot included in a corresponding source video and any number of ladder requirements. In some embodiments, the encoding ladder application encodes each shot included in the source video at multiple resolutions and across multiple values of a quantization parameter ("QP") to generate encoded shots. The higher the value of the QP, the lower the resulting bitrate of the encoded shot at the expense of a lower visual quality level for a corresponding reconstructed shot. For each resolution, the encoding ladder application generates a convex hull of video rate-quality points based on the encoded shots having that resolution. Each of the video rate-quality points specifies an encoded video, the bitrate of the encoded video, the resolution of the encoded video, and a visual quality level of the encoded video.

To generate the convex hull for a given resolution, the encoding ladder application computes the bitrate and estimates the visual quality level for each encoded shot having the resolution. Subsequently, the encoding ladder application performs optimization operations based on the bitrates and the visual quality levels to aggregate the encoded shots into encoded videos. For the resolution, each of the encoded videos is associated with the highest visual quality level for a different bitrate. The encoding ladder application generates a different video rate-quality point for each of the resulting encoded videos to determine the convex hull for the resolution.

Subsequently, the encoding ladder application generates an overall convex hull of video bitrate-quality points based on the convex hulls for the different resolutions. Each of the encoded videos specified via the overall convex hull is associated with the highest visual quality level for the corresponding bitrate. The overall convex hull therefore specifies any number (including none) of encoded videos having each resolution.

To generate the encoding ladder, the encoding ladder application sequentially processes each ladder requirement. Each of the ladder requirements can specify any number and/or types of conditions, constraints, criteria, etc., that the encoding ladder is required to satisfy. To process a given ladder requirement, the encoding ladder application selects any number (including none) of video rate-quality points as new "rung points" such that the accumulated rung points collectively satisfy the ladder requirement. The encoding ladder application determines each rung point preferentially from the overall convex hull and, if necessary, from one of the per-resolution convex hulls. The encoding ladder application can determine the rung points in any technically feasible fashion.

In some embodiments, the encoding ladder application sequentially processes a minimum bitrate requirement, a quality saturation requirement, a bitrate spacing requirement, and a mandatory resolution requirement. The encoding ladder application determines a lowest rung point from the overall convex hull based on a minimum allowed bitrate specified in the minimum bitrate requirement. To process the quality saturation requirement, the encoding ladder application computes a quality saturation bitrate based on the overall convex hull. The encoding ladder application then determines a highest rung point from the overall convex hull based on the minimum of the quality saturation bitrate and a maximum allowed bitrate specified in the quality saturation requirement. The encoding ladder application determines any number of rung points from a region of the overall convex hull that lies between the lowest rung point and the highest rung point based on a target bitrate spacing specified in the bitrate spacing requirement. For each mandatory resolution that is not already represented in the rung points, the encoding ladder application determines a resolution-specific rung point. If at least one video bitrate-quality point in the overall convex hull specifies the mandatory resolution, then the encoding ladder application determines the resolution-specific rung point from the overall convex hull. Otherwise, the encoding ladder application determines the resolution-specific rung point from the convex hull for the mandatory resolution.

After processing the ladder requirements, the encoding ladder application generates the encoding ladder that includes, without limitation, bitrate-resolution pairs corresponding to the rung points. Each of the bitrate-resolution pairs specifies the bitrate and resolution of a different "optimized" encoded video, where the bitrate and visual quality level but not the resolution can vary across the encoded shots of the optimized encoded video. The encoding ladder application also generates an optimized encoded video set that includes, without limitation, the optimized encoded videos corresponding to the rung points. The encoding ladder application stores and/or transmits the encoding ladder to any number of client devices for use by any number and/or types of endpoint applications. The encoding ladder application also stores and/or transmits the optimized encoded video set to a content delivery network.

At least one technical advantage of the disclosed techniques relative to the prior art is that the ladder encoding application generates a different encoding ladder for each media title based on the complexity of each shot in the corresponding source video. More specifically, the ladder encoding application optimizes tradeoffs between bitrate and visual quality across the shots of a given source video to generate an encoding ladder that is customized for the corresponding media title. Consequently, inefficiencies attributable to conventional fixed-bitrate ladders can be reduced. In particular, the ladder encoding application can ensure that the highest bitrate represented by the encoding ladder does not exceed the quality saturation bitrate of the corresponding source video. As a result, when the available network bandwidth exceeds the quality saturation bandwidth, the bitrate of the optimized encoded video selected for streaming can be reduced without noticeable impacting the visual quality of the corresponding reconstructed video. Furthermore, by preferentially selecting rung points from the overall convex hull, the encoding ladder application ensures that any number of bitrate-resolution pairs in each encoding ladder are properly optimized with respect to visual quality. These technical advantages provide one or more technological advancements over prior art approaches.

System Overview

FIG. 1 is a conceptual illustration of a system 100 configured to implement one or more aspects of the various embodiments. For explanatory purposes, multiple instances or versions of like objects are denoted with reference numbers identifying the object and parenthetical alphanumeric character(s) identifying the instance where needed. As shown, in some embodiments, the system 100 includes, without limitation, a compute instance 110, a client device 190, a content delivery network ("CDN") 180, a shot change detector 152, and an encoder 150.

In some other embodiments, the system 100 can omit the client device 190, the CDN 180, the shot change detector 152, or any combination thereof. In the same or other embodiments, the system 100 can include, without limitation, multiple instances of the compute instance 110, multiple instances of the client device 190, multiple instances of the CDN 180, multiple instances of the encoder 150, or any combination thereof. For explanatory purposes only, multiple instances of the compute instance 110 and the client device 190 are also referred to herein as "the compute instances 110" and "the client devices 190," respectively.

The components of the system 100 can be distributed across any number of shared geographic locations and/or any number of different geographic locations and/or implemented in one or more cloud computing environments (i.e., encapsulated shared resources, software, data, etc.) in any combination. In some embodiments, each compute instance 110 can be implemented in a cloud computing environment, implemented as part of any other distributed computing environment, or implemented in a stand-alone fashion.

As shown, the compute instance 110 includes, without limitation, a processor 112 and a memory 116. The processor 112 can be any instruction execution system, apparatus, or device capable of executing instructions. For example, the processor 112 could comprise a central processing unit, a graphics processing unit, a controller, a micro-controller, a state machine, or any combination thereof. The memory 116 stores content, such as software applications and data, for use by the processor 112 of the compute instance 110. The memory 116 can be one or more of a readily available memory, such as random access memory, read only memory, floppy disk, hard disk, or any other form of digital storage, local or remote.

In some other embodiments, each compute instance 110 can include, without limitation, any number of instances of the processor 112 and any number of instances of the memory 116 in any combination. In particular, any number of compute instances 110 (including one) can provide a multiprocessing environment in any technically feasible fashion.

In some embodiments, a storage (not shown) can supplement or replace the memory 116. The storage can include any number and type of external memories that are accessible to the processor 112. For example, and without limitation, the storage can include a Secure Digital Card, an external Flash memory, a portable compact disc read-only memory, an optical storage device, a magnetic storage device, or any suitable combination of the foregoing.

In general, each compute instance 110 is configured to implement one or more software applications. For explanatory purposes only, each software application is described as residing in the memory 116 of the compute instance 110 and executing on the processor 112 of the compute instance 110. However, in some other embodiments, the functionality of each software application can be distributed across any number of other software applications that reside in any number of instances of the memory 116 of any number of compute instances 110 and execute on any number of instances of the processor 112 of any number of compute instances 110 in any combination. Further, the functionality of any number of software applications can be consolidated into a single software application.

In particular, in some embodiments, the compute instance 110 is configured to generate an encoding ladder 172 and an optimized encoded video set 176. As shown, in some embodiments, the encoding ladder 172 includes, without limitation, bitrate-resolution pairs 174(1)-174(L) corresponding to optimized encoded videos 178(1)-178(L), respectively, where L can be any positive integer. In the same or other embodiments, the optimized encoded video set 176 includes, without limitation, the optimized encoded videos 178(1)-178(L).

For explanatory purposes only, the bitrate-resolution pairs 174 are also referred to herein individually as "the bitrate-resolution pair 174" and collectively as "the bitrate-resolution pairs 174." The optimized encoded videos 178(1)-178(L) are also referred to herein individually as "the optimized encoded video 178" and collectively as "the optimized encoded videos 178."

Each of the bitrate-resolution pairs 174 specifies, without limitation, a bitrate (not shown in FIG. 1) and a resolution (not explicitly shown in FIG. 1) of the optimized encoded video 178 corresponding to the bitrate-resolution pair 174. The resolution of the optimized encoded video 178 is the resolution at which a source video 122 corresponding to the media title is encoded to generate the optimized encoded video 178. For explanatory purposes only, the bitrates and the resolutions represented by the encoding ladder 172 refer to the unique bitrates and the unique resolutions, respectively, of the bitrate-resolutions pairs 174(1)-174(L).

The source video 122 includes, without limitation, any amount and/or types of video content. Some examples of video content include, without limitation, any portion (including all) of feature length films, episodes of television programs, and music videos, to name a few. Each of the optimized encoded videos 178 includes, without limitation, encoded video content that is derived from the video content included in the source video 122.

In some embodiments, the compute instance 110 is configured to transmit the encoding ladder 172 to any number of client devices 190 and the optimized encoded video set 176 to the CDN 180. The client device 190 can be any type of device that is capable of executing an endpoint application 192 and displaying an image and/or any other type of visual content via any type of display 194. For example, the client device 190 could be, without limitation, a smart television, a game console, a desktop computer, a laptop, a smartphone, a tablet, etc. The display 194 could be, without limitation, a liquid crystal display, a light-emitting diode display, a projection display, a plasma display panel, etc.

The CDN 180 stores any number of copies of the optimized encoded video set 176 and any amount and/or types of other digital content in any number of servers that are located in any number of different geographic regions. In the same or other embodiments, the CDN 180 transmits digital content to client devices 190 in response to instances of a stream request 182.

In some embodiments, to playback the media title associated with the source video 122 on the client device 190, an endpoint application 192 executing on the client device 190 selects one of the bitrate-resolution pairs 174 included in the encoding ladder 172 based on the available network bandwidth of the connection between the client device 190 and the CDN 180 and/or the resolution of the display 194. The endpoint application 192 transmits the steam request 182 to the CDN 180 to request that the CDN 180 stream at least a portion of the optimized encoded video 178 corresponding to the selected one of the bitrate-resolution pairs 174 to the client device 190. In response, the CDN 180 streams chunks of the optimized encoded video 178 to the client device 190 for playback.

In some embodiments, each chunk of the optimized encoded video 178 is a different instance of an encoded shot 188. Each instance of the encoded shot 188 includes encoded video content that is derived from video content included in a different one of shots 158(1)-158(M), where M can be any positive integer. In some embodiments, each of the shots 158(1)-158(M) includes, without limitation, a set of frames of the source video 122 that usually have similar spatial-temporal properties and run for an uninterrupted period of time. In the same or other embodiments, each of the shots 158(1)-158(M) is captured continuously from a single camera or virtual representation of a camera (e.g., in the case of computer animated videos). Together, the shots 158(1)-158(M) span the length of the source video 122 in a contiguous, non-overlapping fashion.

For explanatory purposes only, FIG. 1 depicts the encoded shot 188 that is selected and streamed to the client device 190 at a particular point in time. In some embodiments, upon receiving the encoded shot 188, the endpoint application 192 decodes the encoded shot 188 to generate a decoded shot (not shown). The endpoint application 192 performs any number (including none) and/or types of resampling operations (e.g., upsampling operations or downsampling operations) on the decoded shot to generate a reconstructed shot 198 having the same resolution as the display 194. The endpoint application 192 causes the reconstructed shot 190 to be played back on the client device 190.

The shots 158(1)-158(M) are also referred to herein individually as "the shot 158" and collectively as "the shots 158." Instances of the encoded shot 188 are also referred to herein individually as "the encoded shot 188" and collectively as "the encoded shots 188." Instances of the reconstructed shot 198 are also referred to herein individually as "the reconstructed shot 198" and collectively as "the reconstructed shots 198."

Over time, the client device 190 typically receives a sequence of encoded shots 188 corresponding to a sequence of shots 158. The endpoint application 192 generates a sequence of reconstructed shots 198 corresponding to the sequence of shots 158 and causes the sequence of reconstructed shots 198 to be played back on the client device 190 to effect playback of at least a portion of the media title. For explanatory purpose only, a reconstructed video (not shown) includes, without limitation, M different reconstructed shots 198 that approximate the shots 158(1)-158(M), respectively.

As described previously herein, in one conventional approach to generating an encoding ladder, source videos corresponding to a variety of media titles are encoded at numerous bitrate-resolution pairs to generate multiple encoded videos for each media title. Based on various tradeoffs between the bitrates of the encoded videos and the visual quality levels of reconstructed videos corresponding to the encoded videos, a relatively small number of bitrate-resolution pairs are selected for inclusion in an encoding ladder. Each of the selected bitrate-resolution pairs corresponds to a different bitrate, and the resulting encoding ladder is known as a "fixed-bitrate ladder." The fixed-bitrate ladder is used to generate the encoded videos for all media titles included in a given library of media titles.

One drawback of using a fixed-bitrate ladder is that because the complexities of the video content included in different source videos can vary substantially, the tradeoffs between bitrate and visual quality represented by the fixed-bitrate ladder can be suboptimal for some source videos. As described previously herein in greater detail, encoding using the fixed-bitrate ladder can result in encoding and transmission inefficiencies in such cases.

Generating an Encoding Ladder Using Shot-Based Encoding

To address the above problems, the system 100 includes, without limitation, an encoding ladder application 130 that customizes the encoding ladder 172 for the media title based on the complexities of the shots 158 and a ladder requirement set 124. As shown, in some embodiments, the encoding ladder application 130 also generates the optimized encoded video set 176 corresponding to both the encoding ladder 172 and the source video 122. The ladder requirement set 124 includes, without limitation, any number and/or types of ladder requirements (not shown in FIG. 1) that the encoding ladder 172 is to satisfy.

In some embodiments, the ladder requirement set 124 includes, without limitation, a quality saturation requirement specifying a highest allowed bitrate and stipulating that the highest bitrate represented by the encoding ladder 172 is to exceed neither a quality saturation bitrate (not shown in FIG. 1) nor the highest allowed bitrate. In the same or other embodiments, the ladder requirement set 124 includes, without limitation, a mandatory resolution requirement that specifies any number of mandatory resolutions that the encoding ladder 172 is to represent.

Although not depicted, in some embodiments, the encoding ladder application 130 can generate any number of instances of the encoding ladder 172 and optionally generate corresponding instances of the optimized encoded video set 176 that are each customized for the media title based on a different instance of the ladder requirement set 124. In the same or other embodiments, for each of any number of media titles, the encoding ladder application 130 can generate any number of instances of the encoding ladder 172 and optionally generate corresponding instances of the optimized encoded video set 176 that are each customized for the media title based on any number of instances of the ladder requirement set 124.

As shown, in some embodiments, the encoding ladder application 130 resides in the memory 116 of the compute instance 110 and executes on the processor 112 of the compute instance 110. In some other embodiments, the encoding ladder application 130 can reside in any number of instances of the memory 116 of any number of compute instances 110 and execute in any number of instances of the processor 112 of any number of compute instances 110 in any combination. In the same or other embodiments, the functionality of the encoding ladder application 130 can be distributed across any number of software applications that execute on any number of compute instances 110.

In some embodiments, the encoding ladder application 130 includes, without limitation, a shot encoding engine 140 and a ladder generator 170. As shown, the shot encoding engine 140 partitions the source video 122 into the shots 158(1)-158(M). The shot encoding engine 140 can partition the source video 122 into any number and/or types of shots 158 in any technically feasible fashion. For instance, in some embodiments, the shot encoding engine 140 partitions the source video 122 into shots 158 based on shot changes (not shown). Each shot change specifies a boundary between a different pair of shots 158. The shot encoding engine 140 can determine the shot changes in any technically feasible fashion.

As shown, in some embodiments, the shot encoding engine 140 transmits the source video 122 to the shot change detector 152. To determine the shot changes, the shot change detector 152 applies any number of shot detection algorithms to the source video 122. Some examples of shot detection algorithms include, without limitation, a multi-scale sum-of-absolute-differences algorithm, a motion-compensated residual energy algorithm, a histogram of differences algorithm, and a difference of histograms algorithm. The shot change detector 152 then transmits the shot changes to the shot encoding engine 140. In some other embodiments, the shot encoding engine 140 can perform any number of shot detection operations on the source video 122 to determine the shot changes.

In some embodiments, the shot encoding engine 140 also removes extraneous pixels from the source video 122. For example, the shot encoding engine 140 could remove pixels included in black bars along border sections of the source video 122. In the same or other embodiments, the shot encoding engine 140 ensures that the initial frame of each of the shots 158 is encoded as a key frame during encoding operations. In some embodiments, when a "key frame" is included in the encoded shot 188, the key frame and all subsequent frames of the encoded shot 188 are decoded independently of any proceeding frames of a sequence of encoded shots 188 (e.g., an encoded video).

The shot encoding engine 140 can ensure that the different initial frames of the shots 158 are encoded as key frames in any technically feasible fashion. For instance, in some embodiments, the shot encoding engine 140 configures the encoder 150 to encode frames as key frames based on a key frame location list (not shown). In some other embodiments, the shot encoding engine 140 performs any number and/or types of encoding operations to encode the different initial frames of the shots 158 as key frames.

As persons skilled in the art will recognize, during playback, the media title associated with the source video 122 is switchable between decoded versions of the media title derived from the optimized encoded videos 178 at aligned key frames to optimize a viewing experience based on any number of relevant criteria. Examples of relevant criteria include the current connection bandwidth, the current connection latency, the content of the shot 158 that is to be streamed next, and the like.

As shown, in some embodiments, the shot encoding engine 140 generates encoded shot sets 160(1,1)-160(N,M) based on the shots 158(1)-158(M), resolutions 142(1)-142(N), and encoding parameter sets 144(1)-144(P), where N and P can be any positive integers. For explanatory purposes only, the encoded shot sets 160(1,1)-160(M,N) are also referred to herein individually as "the encoded shot set 160" and collectively as "the encoded shot sets 160." The resolutions 142(1)-142(N) are also referred to herein individually as "the resolution 142" and collectively as "the resolutions 142." The encoding parameter sets 144(1)-144(P) are also referred to herein individually as "encoding parameter set 144" and collectively as "the encoding parameter sets 144."

Each of the encoding parameter sets 144 specifies a different set of values for a set of any number and/or types of encoding parameters. In some embodiments, each of the encoding parameter sets 144 specifies, without limitation, a different value for a QP that allows a monotonic performance in terms of bitrate and visual quality level when encoding video content. A value for QP is also referred to herein as a "QP value." The higher the QP value, the lower the resulting bitrate of the encoded video content at the expense of a lower visual quality level for decoded video content that is derived from the encoded video content.

For explanatory purposes only, different instances of the encoded shot set 160 are labelled using a parenthetical index notation where needed. The parenthetical index notation for the encoded shot set 160 specifies two comma separated numbers, where the first number is an index into the resolutions 142 and the second number is an index into the shots 158. In some embodiments, the shot encoding engine 140 therefore generates N×M instances of the encoded shot set 160.

In some embodiments, to generate the encoded shot set 160($n,m$), the shot encoding engine 140 encodes the shot 158($m$) at P encoding points (not shown), where each of the encoding points specifies the resolution 142($n$) and a different one of the encoding parameter sets 144. As referred to herein, each encoding point specifies one of the resolutions 142 and one of the encoding parameter sets 144. The encoded shot set 160($n,m$), therefore includes, without limitation P of the encoded shots 188, where each of the encoded shots 188 has the resolution 142($n$) and corresponds to the shot 158($m$).

For instance, in some embodiments, the resolutions 142 are 384×216, 480×270, 608×342, 768×432, 960×540, 1280×720, 1920×1080, 2560×1440, and 3840×2160, and the encoding parameter sets 144 specify fifteen different QP values. In some such embodiments, to generate the encoded shot set 160(1,1), the shot encoding engine 140 encodes the shot 158(1) at fifteen encoding points that each specifies the resolution 384×216 and a different QP value. And, in such embodiments, to generate the encoded shot set 160(9,M), the shot encoding engine 140 encodes the shot 158(M) at fifteen different encoding points that each specifies the resolution 3840×2160 and a different QP value.

In some other embodiments, each of the resolutions 142 can be associated with a different subset of the encoding parameter sets 144. For instance, in some embodiments, each of the resolutions 142(1) and 142(N) is associated with the encoding parameter sets 144(1) and 144(P), and each the resolutions 142(2)-142(N−1) is associated with the encoding parameter sets 144(1)-144(P). In such embodiments, each of the encoded shot sets 160(1,1)-142(1,M) and 142(N,1)-142(N,M) includes, without limitation two of the encoded shots 188, and each of the encoded shot sets 160(2,1)-142(N−1,M) includes, without limitation, P of the encoded shots 188.

The shot encoding engine 140 can generate the encoded shots 188 that are included in the encoded shot set 160($n,m$) in any technically feasible fashion. For instance, in some embodiments, if the resolution of the shot 158($m$) is equal to the resolution 142($n$), then shot encoding engine 140 configures the encoder 150 to encode the shot 158($m$) at each of the encoding parameter sets 144 to generate the encoded shots 188 that are included in the encoded shot set 160($n,m$). Otherwise, the shot encoding engine 140 resamples (e.g., downsamples or upsamples) the shot 158($m$) to generate a resampled shot having the resolution 142($n$). Subsequently, the shot encoding engine 140 configures the encoder 150 to encode the resampled shot at each of the encoding parameter sets 144 to generate the encoded shots 188 that are included in the encoded shot set 160($n,m$).

The encoder 150 can implement any number and/or types of encoding algorithms. In some embodiments, the encoder 150 is configured to efficiently perform encoding operations via one or more parallel encoders (not shown). In the same or other embodiments, the encoder 150 and any number (including none) of the parallel encoders reside and execute on any number of compute instances 110 included in a cloud environment. In some other embodiments, the shot encoding engine 140 implements any number and/or types of encoding algorithms. In the same or other embodiments, the system 100 omits the encoder 150.

The shot encoding engine 140 can perform and/or configure any number of software applications (including none) to perform any number of resampling operations and any number of encoding operations at any level of granularity in any combination to generate the encoded shots 188. Some examples of levels of granularity include, without limitation, per frame, per shot, and per video.

For instance, in some embodiments, the shot encoding engine 140 performs resampling operations on the source video 122 to generate a resampled video having the resolution 142($n$). Subsequently, the shot encoding engine 140 partitions the resampled video into resampled shots and configures the encoder 150 to encode each of the resampled shots at each of the encoding parameter sets 144 to generate the resolution-specific subset of the encoded shots 188 that share the resolution 142($n$). The shot encoding engine 140 then distributes the encoded shots 188 included in the resolution-specific subset across the encoded shot sets 160($n$,1)-160($n$,M) based on the corresponding shots 158.

As shown, in some embodiments, the ladder generator 170 generates the encoding ladder 172 and the optimized encoded video set 176 based on the shots 158, the resolutions 142, and the encoded shot sets 160(1,1)-160(N,M). As described in greater detail below in conjunction with FIGS. 2-4D, in some embodiments, the ladder generator 170 configures a convex hull generator (not shown in FIG. 1) to generate a different convex hull (not shown in FIG. 1) of video bitrate-quality points (not shown in FIG. 1) for each of the resolutions 142(1)-142(N).

As a general matter, the convex hull of a set of points in a Euclidean space is the smallest convex set that contains the set of points. In a Euclidean space, a convex set is a region such that, for every pair of points within the region, every point on the straight line segment that joins the pair of points is also within the region. The convex hull of a finite point set forms a convex polygon, in which case it can be partitioned into two polygonal chains known as the upper hull and the lower hull, stretching between the leftmost and rightmost points of the hull. In the context of the ladder generator 170, each of the convex hulls is a lower hull that includes, without limitation, any number of video bitrate-quality points for a different one of the resolutions 142(1)-142(N).

In some embodiments, each video bitrate-quality point includes, without limitation, a different encoded video, the resolution 142 of the encoded video, the bitrate (not shown in FIG. 1) of the encoded video, and a visual quality level (not shown in FIG. 1) associated with the encoded video. Each of the encoded videos is a sequence of M of the encoded shots 188 corresponding to the sequence of shots 158(1)-158(M).

In some embodiments, the bitrate of and visual quality level (not shown in FIG. 1) associated with a given encoded video can vary across the encoded video, but the resolution does not vary across the encoded video. More specifically, the M of the encoded shots 188 included in a given encoded video share a single one of the resolutions 142, but the bitrates of and visual quality levels associated with the M of the encoded shots 188 can vary.

As used herein, the bitrate of an encoded set of frames (e.g., the encoded shot 188, the optimized encoded video 178, the encoded video, etc.) refers to an average bitrate across the encoded set of frames. The visual quality level associated with an encoded set of frames refers to the visual quality level of a reconstructed set of frames derived from the encoded set of frames. And the visual quality level of a reconstructed set of frames refers to an average visual quality level across the reconstructed set of frames.

Importantly, for each resolution 142, each of the encoded videos specified via the convex hull for the resolution 142 is associated with the highest visual quality level for the combination of the corresponding bitrate and the resolution 142. For a given convex hull, "the encoded videos specified via the convex hull" refers herein to the encoded videos included in the video bitrate-quality points of the convex hull.

The ladder generator 170 generates an overall convex hull of video bitrate-quality points based on the N different convex hulls for the resolutions 142(1)-142(N). Accordingly, the resolutions 142 of the encoded videos specified via the overall convex hull can vary. Notably, each of the encoded videos specified via the overall convex hull is associated with the highest visual quality level for the corresponding bitrate.

As described in greater detail below in conjunction with FIG. 2, the ladder generator 170 generates the encoding ladder 172 and the optimized encoded video set 176 based on the overall convex hull, the convex hulls, and the ladder requirement set 124. In some embodiments, to generate the encoding ladder 172, the ladder generator 170 processes each ladder requirement in the order specified in the ladder requirement set 124 to determine any number of rung points (not shown in FIG. 1), where each rung point is a different video bitrate-quality point. To process a given ladder requirement, the ladder generator 170 determines any number (including none) of rung points for the ladder requirement such that the rung points for the ladder requirement and the rung points for any preceding ladder requirements collectively satisfy the ladder requirement.

In some embodiments, the ladder generator 170 determines each rung point preferentially from the overall convex hull and, if necessary, from one of the convex hulls. For each rung point that is in the overall convex hull, the encoded video included in the rung point is associated with the highest visual quality level for the corresponding bitrate. For each rung point that is not in the overall convex hull, the encoded video included in the rung point is associated with the highest visual quality level for the combination of the bitrate of the rung point and the resolution 142 of the rung point.

The ladder generator 170 generates the encoding ladder 172 and the optimized encoded video set 176 based on the rung points. In some embodiments, the ladder generator 170 initializes the encoding ladder 172 and the optimized encoded video set 176 to empty sets. For each of the rung points, the ladder generator 170 generates the bitrate-resolution pair 174 that specifies, without limitation, the bitrate included in the rung point and the resolution 142 included in the rung point and then adds the bitrate-resolution pair 174 to the encoding ladder. In a complementary fashion, the ladder generator 170 adds the encoded video included in the rung point to the optimized encoded video set 176 as one of the optimized encoded videos 178.

In some other embodiments, the ladder generator 170 can specify any amount and/or types of information that is relevant to selecting one of the optimized encoded videos 178 for streaming based on the encoding ladder 172 in any technically feasible fashion. For instance, in some embodiments, for each of the bitrate-resolutions pairs 172 the ladder generator 170 also specifies the visual quality level included in the corresponding rung point via the encoding ladder 172. In the same or other embodiments, the ladder generator 170 can associate each of the bitrate-resolution pairs 174 included in the encoding ladder 172 with the encoded video specified in the corresponding rung point in any technically feasible fashion instead of or in addition to via the optimized encoded video set 176.

In some embodiments, the ladder generator 170 stores the encoding ladder 172 and/or the optimized encoded video set 176 in any number and/or types of memories (e.g., memories that are accessible to the client device 190 and/or the content delivery network 180). In the same or other embodiments, the ladder generator 170 transmits the encoding ladder 172 to any number of client devices 190, any number of computer instances 110, any number and/or types of software applications, or any combination thereof. In the same or other embodiments, the ladder generator 170 transmits the optimized encoded video set 176 to any number of instances of the CDN 180, any number of client devices 190, any number of computer instances 110, any number and/or types of software applications, or any combination thereof.

Note that the techniques described herein are illustrative rather than restrictive and can be altered without departing from the broader spirit and scope of the invention. Many modifications and variations on the functionality provided by the encoding ladder application 130, the shot encoding engine 140, the ladder generator 170, the shot change detector 152, the encoder 150, the CDN 180, and the endpoint application 192 will be apparent to those of ordinary skill in the art without departing from the scope and spirit of the described embodiments.

For instance, in some embodiments, one or more of the encoding ladder application 130, the shot encoding engine 140, the ladder generator 170, the shot change detector 152, the encoder 150, the CDN 180, and the endpoint application 192 can be configured to identify and operate on sets of frames for which a consistency metric lies within a specified range instead of the shots 158. Each set of frames is also referred to herein as a "subsequence." In a complementary fashion, an encoded set of frames is also referred to herein as "an encoded subsequence."

In some embodiments, the encoding ladder application 130 can generate the convex hulls and the overall convex hulls in any technically feasible fashion based on encoded shot sequences associated with any number of encoding points. In the same or other embodiments, the ladder generator 170 can generate the encoding ladder 172 based on the overall convex hull and optionally any number of the convex hulls in any technically feasible fashion. For instance, in some embodiments, the ladder generator 170 can generate the encoding ladder 172 based on any number and/or type of criteria instead of or in addition to the ladder requirement set 124. In the same or other embodiments, the system 100 omits the ladder requirement set 124.

It will be appreciated that the system 100 shown herein is illustrative and that variations and modifications are possible. For example the functionality provided by the encoding ladder application 130, the shot encoding engine 140, the ladder generator 170, the shot change detector 152, the encoder 150, the CDN 180, and the endpoint application 192 as described herein can be integrated into or distributed across any number of software applications (including one), hardware devices (e.g., a hardware-based encoder), and any number of components of the system 100. Further, the connection topology between the various units in FIG. 1 can be modified as desired.

Figure 2:
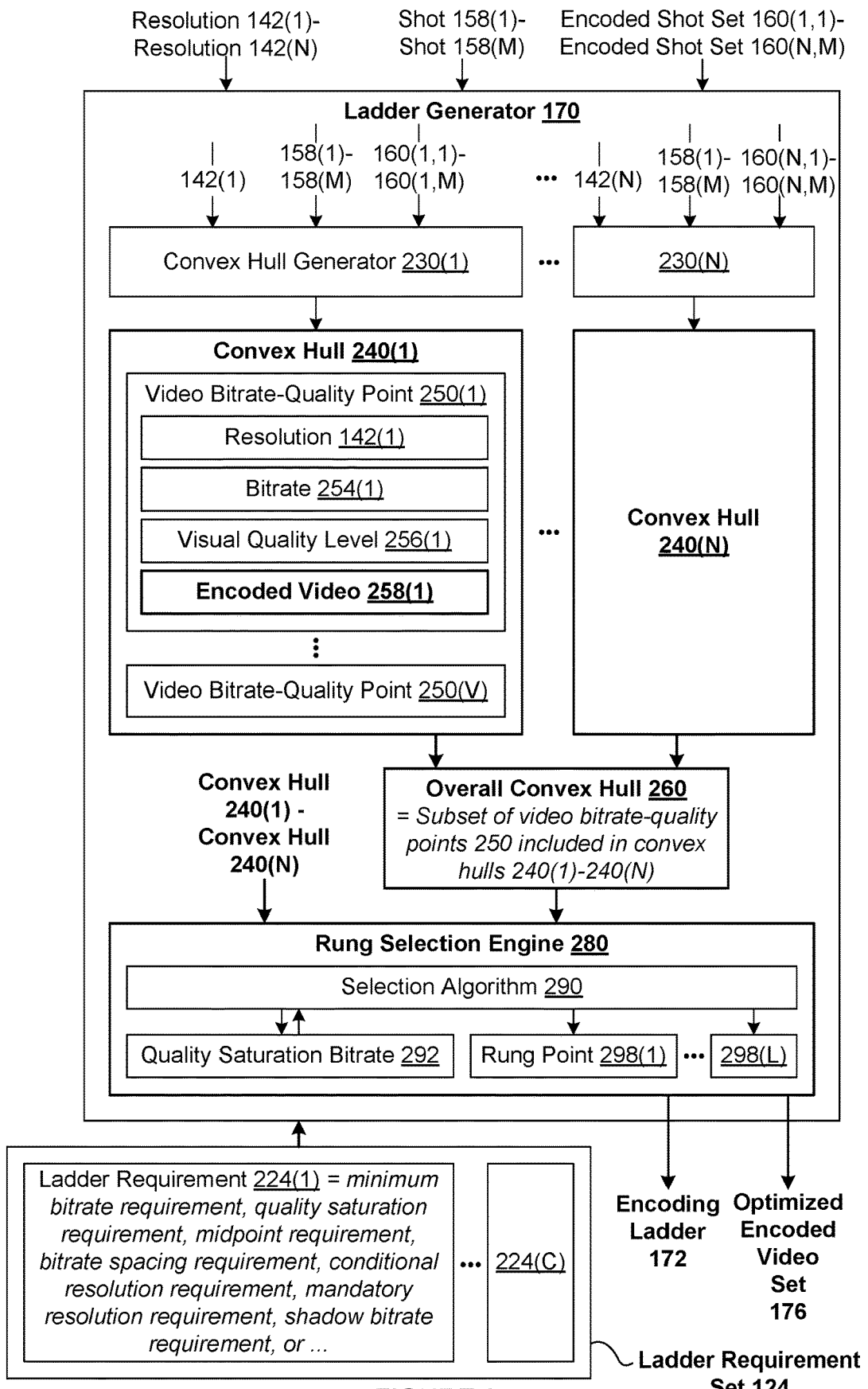
FIG. 2 is a more detailed illustration of the ladder generator of FIG. 1, according to various embodiments.

FIG. 2 is a more detailed illustration of the ladder generator 170 of FIG. 1, according to various embodiments. As shown, in some embodiments the ladder generator 170 generates the encoding ladder 172 and the optimized encoded video set 176 based on the resolutions 142(1)-142(N), the shots 158(1)-158(M), and the encoded shot sets 160(1,1)-160(N,M). In the same or other embodiments, the ladder generator 170 includes, without limitation, convex hull generators 230(1)-230(N) and a rung selection engine 280.

As shown, in some embodiments, the ladder generator 170 configures the convex hull generators 230(1)-230(N) to generate convex hulls 240(1)-240(N), respectively, that are associated with the resolutions 142(1)-142(N), respectively. Each of the convex hull generators 230(1)-230(N) is a different instance of a single software application, referred to herein as "the convex hull generator 230" (not explicitly shown). The convex hull generators 230(1)-230(N) are also referred to herein individually as "the convex hull generator 230" and collectively as "the convex hull generators 230.".

As shown, the convex hull 240(1) includes, without limitation, video bitrate-quality points 250(1)-250(V), where V can be any positive integer. For explanatory purposes only, the convex hulls 240(1)-240(N) are also referred to herein individually as "the convex hull 240" and "the convex hull 240 of video bitrate-quality points" and collectively as "the convex hulls 240" and "the convex hulls 240 of video bitrate-quality points." Instances of the video bitrate-quality point 250 (including the video bitrate-quality points 250(1)-250(V)) are also referred to herein individually as "the video bitrate-quality point 250" and collectively as the video bitrate-quality points 250." Although not explicitly shown, each of the convex hulls 240(2)-240(N) includes, without limitation, any number of video bitrate-quality points 250. The number of video bitrate-quality points 250 in each of the convex hulls 240(1)-240(N) can vary.

As shown, in some embodiments, the ladder generator 170 configures the convex hull generator 230($n$), where n is an integer from 1 to N, to generate the convex hull 240($n$) based on the resolution 142($n$), the shots 158(1)-158(M), and the encoded shot sets 160($n$,1)-160($n$,M) that are associated with the resolution 142($n$). In some other embodiments, the ladder generator 170 can configure less than N convex hull generators 230 to generate the convex hulls 240(1)-240(N) sequentially, concurrently, or in any combination thereof. For instance, in some embodiments, the ladder generator 170 configures the convex hull generator 230(1) to sequentially generate the convex hulls 240(1)-240(N).

In some embodiments, each video bitrate-quality point 250 includes, without limitation, a different instance of an encoded video 258, the resolution 142 of the encoded video 258, a bitrate 254 of the encoded video 258, and a visual quality level 256 associated with the encoded video 258. For explanatory purposes only, instances of the encoded video 258 are also referred to herein individually as "the encoded video 258" and collectively as "the encoded videos 258." Instances of the bitrate 254 are also referred to herein individually as "the bitrate 254," and collectively as "the bitrates 254." Instances of the visual quality level 256 are also referred to herein individually as "the visual quality level 256" and collectively as "the visual quality levels 256."

Each of the encoded videos 258 is a sequence of M of the encoded shots 188 corresponding to the sequence of the shots 158(1)-158(M), where the bitrates 254 of and the visual quality levels 256 associated with the encoded shots 188 can vary, but the resolutions 142 of the encoded shots 188 do not vary. Because the convex hull 240($n$) is associated with the resolution 142($n$), where n is an integer between 1 and N, each of the encoded videos 258 specified via the convex hull 240($n$) has the resolution 142($n$). Accordingly, each of the video bitrate-quality points 250 in the convex hull 240($n$) includes the resolution 142($n$). As described in greater detail below in conjunction with FIG. 3, in some embodiments, the convex hull generator 230 ensures that each of the encoded videos 258 specified via the convex hull 240($n$) is associated with the highest of the visual quality levels 256 for the combination of the bitrate 254 and the resolution 142(n).

As shown, in some embodiments, the ladder generator 170 generates an overall convex hull 260 based on the convex hulls 240(1)-240(N). The overall convex hull 260 is a subset of the union of the video bitrate-quality points 250 of the convex hulls 240(1)-240(N). For explanatory purposes only, the overall convex hull 260 is also referred to herein as "the overall convex hull 260 of video bitrate-quality points." The encoded videos 258 that are included in the video bitrate-quality points 250 in the overall convex hull 260 are also referred to herein as "the encoded videos 258 specified via the overall convex hull 260." The ladder generator 170 can generate the overall convex hull 260 in any technically feasible fashion that ensures each of the encoded videos 258 specified via the overall convex hull 260 is associated with the highest of the visual quality levels 256 for the bitrate 254.

Persons skilled in the art will understand that many techniques for generating convex hulls are well known in the field of mathematics, and the ladder generator 170 can implement any number of such techniques to generate the overall convex hull 260. For instance, in some embodiments, the ladder generator 170 generates a convex hull curve (not shown in FIG. 2) for each of the convex hulls 240(1)-240(N). To generate the convex hull curve for the convex hull 240(n), where n is an integer from 1 to N, the ladder generator 170 plots each of the video bitrate-quality points 250 in the convex hull 240(n) by locating the bitrate 254 along a bitrate axis (not show in FIG. 2) and the visual quality level 256 along a quality axis (not shown in FIG. 2).

After generating the convex hull curves, the ladder generator 170 evaluates the video bitrate-quality points 250 along the convex hull curves to determine the overall convex hull 260. More specifically, the ladder generator 170 identifies the subset of the video bitrate-quality points 250 across all the convex hull curves that form a boundary where all the video bitrate-quality points 250 reside on one side of the boundary and also are such that connecting any two consecutive video bitrate-quality points 250 included in the identified subset with a straight line leaves all the video bitrate-quality points 250 that are not included in the identified subset on the same side of the line. The overall convex hull 260 is the identified subset of the video bitrate-quality points 250.

As shown, in some embodiments, the rung selection engine 280 generates the encoding ladder 172 and the optimized encoded video set 176 based on the overall convex hull 260, the convex hulls 240, and the ladder requirement set 124. The ladder requirement set 124 includes, without limitation, ladder requirements 224(1)-224 (C), where C can be any positive integer. Each of the ladder requirements 224 can specify any number and/or types of conditions, constraints, criteria, etc., that the encoding ladder 172 is required to satisfy in any technically feasible fashion.

As depicted in italics, in some embodiments, each of the ladder requirements 224 can be, without limitation, a minimum bitrate requirement, a quality saturation requirement, a midpoint requirement, a bitrate spacing requirement, a conditional resolution requirement, a mandatory resolution requirement, or a shadow bitrate requirement. A minimum bitrate requirement specifies a lowest allowed bitrate and stipulates that none of the bitrates 254 represented by the encoding ladder 172 is to be lower than the lowest allowed bitrate. A quality saturation requirement specifies a highest allowed bitrate and stipulates that the highest of the bitrates 254 represented by the encoding ladder 172 is to exceed neither a quality saturation bitrate 292 nor the highest allowed bitrate.

A midpoint requirement stipulates that one of the bitrates 254 represented by the encoding ladder 172 is to be approximately midway between the highest and the lowest of the bitrates 254 represented by the encoding ladder 172. A bitrate spacing requirement specifies a target bitrate spacing for the bitrates 254 represented by the encoding ladder 172. A conditional resolution requirement specifies one or more conditional resolutions and stipulates that for each conditional resolution that is represented by the overall convex hull 260, the resolution of at least one of the bitrate-resolution pairs 174 in the encoding ladder 172 is to equal the conditional resolution.

A mandatory resolution requirement specifies one or more mandatory resolutions and stipulates that for each mandatory resolution, the resolution 142 of at least one of the bitrate-resolution pairs 174 in the encoding ladder 172 is to equal the mandatory resolution. A shadow bitrate requirement specifies a mandatory resolution, a corresponding minimum visual quality level, and any number and/or types of additional conditions and stipulates that the encoding ladder 172 is to represent the mandatory resolution to at least the minimum visual quality level as per the conditions. Some examples of conditions include, without limitation, a maximum number of shadow points, a target bitrate spacing for the shadow resolution, and a minimum bitrate to be represented by the shadow resolution.

In some embodiments, the rung selection engine 280 includes, without limitation, a selection algorithm 290. The selection algorithm 290 determines rung points 298(1)-298 (L), where L can be any positive integer, based on the ladder requirement set 124, the overall convex hull 260, and any number (including none) of the convex hulls 240. For explanatory purposes only, the rung points 298(1)-298(L) are also referred to herein individually as "the rung point 298" and collectively as "the rung points 298." The rung points 298(1)-298(L) are L of the video bitrate-quality points 250 that are distributed across any number of the convex hulls 240 in any combination. Any number of the rung points 298(1)-298(L) are also in the overall convex hull 260. The selection algorithm 290 can determine the rung points 298(1)-298(L) in any technically feasible fashion.

In some embodiments, the selection algorithm 290 sequentially processes the ladder requirements 224(1)-224 (R) in the order in which the ladder requirements 224 are specified in the ladder requirement set 124 to determine the rung points 298. To process the ladder requirement 224(r), where r is an integer from 1 to R, the selection algorithm 290 determines any number (including none) of rung points 298 for the ladder requirement 224(r) such that the rung points 298 for the ladder requirement 224(r) and the rung points 298 for the ladder requirements 224(1)-224(r−1) collectively satisfy the ladder requirement 224(r). The selection algorithm 290 can determine the rung points 298 for the ladder requirement 224(r) in any technically feasible fashion.

In some embodiments, the selection algorithm 290 determines whether the ladder requirement 224(r) is already satisfied by the rung points 298 for the ladder requirements 224(1)-224(r−1). If the ladder requirement 224(r) is already satisfied, then the selection algorithm 290 does not determine any rung points 298 for the ladder requirement 224(r). Otherwise, the selection algorithm 290 computes any amount and/or types of information that facilitates determining the rung points 298 for the ladder requirement 224(r).

As shown, in some embodiments, if the ladder requirement 224(r) is a quality saturation requirement, then the selection algorithm 290 computes the quality saturation bitrate 292 based on the overall convex hull 260. The quality saturation bitrate 292 is the bitrate 254 at which increasing the number of bits used to encode the source video 122 does not perceptibly increase the visual quality of the corresponding reconstructed video. The selection algorithm 290 can compute the quality saturation bitrate 292 in any technically feasible fashion. For instance, in some embodiments, the selection algorithm 290 evaluates the overall convex hull 260 to determine a saturation point at which the slope of a corresponding overall convex hull curve (not shown in FIG. 2) decreases below a saturation slope and then sets the quality saturation bitrate 292 equal to the bitrate 254 of the saturation point.

In some other embodiments, the selection algorithm 290 detects a knee point associated with the overall convex hull 260 and then implements any number and/or types of heuristics to compute the quality saturation bitrate 292 based on the knee point. As referred to herein the "knee point" associated with the overall convex hull 260 is an inflection point for the corresponding overall convex hull curve. Persons skilled in the art will understand that many techniques for determining a knee point of a curve are well known in the field of mathematics, and the selection algorithm 290 can implement any number of such techniques to detect the knee point associated with the overall convex hull 260. For instance, in some embodiments, the selection algorithm 290 splits the overall convex hull curve into two line segments. The selection algorithm 290 then sets the knee point equal to the point that minimizes the sum of the vertical distances (or vertical projections) between the video bitrate-quality points 250 in the overall convex hull 260 and the respective line segments In some embodiments, before selecting one or more of the video bitrate-quality points 250 as rung points 298 for the ladder requirement 224(r), the selection algorithm 290 determines whether or not the ladder requirement 224(r) specifies any mandatory resolutions. If the ladder requirement 224(r) does not specify any mandatory resolutions, then the selection algorithm 290 selects each rung point 298 for the ladder requirement 224(r) from the video bitrate-quality points 250 in the overall convex hull 260.

By contrast, if the ladder requirement 224(r) specifies one or more mandatory resolutions, then the selection algorithm 290 selects each rung point 298 for the ladder requirement 224(r) preferentially from the video bitrate-quality points 250 in the overall convex hull 260 and, if necessary, from the video bitrate-quality points 250 in one of the convex hulls 240. More specifically, if the selection algorithm 290 is unable to determine rung points 298 from the overall convex hull 260 that satisfy the ladder requirement 224(r), then the selection algorithm 290 selects any number of the video bitrate-quality points 250 from any number of the convex hulls 240 as rung points 298 for the ladder requirement 224(r).

For instance, if the ladder requirement 224(r) specifies that the resolution 142(1) is a mandatory resolution and none of the video bitrate-quality points 250 in the overall convex hull 260 has the resolution 142(1), then the selection algorithm 290 selects the rung point 298 for the ladder requirement 224(r) from the convex hull 240(1). In some embodiments, when selecting video bitrate-quality points 250 from convex hulls 240 as rung points 298, the selection algorithm 290 attempts to select video bitrate-quality points 250 that lie closest to the overall convex hull 260.

The selection algorithm 290 can implement any number and/or type of operations, heuristics, etc., based on any number of the ladder requirements 224 to determine the rung points 298 for each of the ladder requirements 224. For instance, in some embodiments, the ladder requirements 224(1) and 224(2) are, in any order, a minimum bitrate requirement and a quality saturation requirement that establish the lowest bitrate and the highest bitrate represented by the encoding ladder 172. When determining the rung points 298 for each of the ladder requirements 224(3)-224(R), the selection algorithm 290 determines rung points 298 having bitrates 254 that lie between the lowest bitrate and the highest bitrate.

In some embodiments, if the ladder requirement 224(r) does not specify a target bitrate spacing, then the selection algorithm 290 selects the rung points 298 for the ladder requirements 224(r), such that the minimum bitrate spacing between the rung points 298 for the ladder requirements 224(1)-224(r) is maximized. In the same or other embodiments, if the ladder requirement 224(r) specifies a target bitrate spacing, then the selection algorithm 290 implements a traversing technique to fulfill the target bitrate spacing. More precisely, the selection algorithm 290 traverses the rung points 298 for the ladder requirements 224(1)-224(r−1) from the lowest to the highest of the bitrates 254. During the traversal, if the bitrate spacing between adjacent rung points 298 is greater than the target bitrate spacing, then the selection algorithm 290 determines any number of rung points 298 for the ladder requirement 224(r) having bitrates 254 that lie between the bitrates 254 of the adjacent rung points 298.

In some embodiments, the selection algorithm 290 ensures monotonicity of visual quality level 256 and resolution 142 with increasing bitrate 254. More specifically, if the bitrate 254 of the rung point 298(i) is greater than the bitrate 254 of the rung point 298(j), where i and j are different integers between 1 and L, then the visual quality level 256 and the resolution 142 of the rung point 298(i) are greater than or equal to the visual quality level 256 and the resolution 142, respectively, of the rung point 298(j).

As shown, the rung selection engine 280 generates the encoding ladder 172 and the optimized encoded video set 176 based on the rung points 298(1)-298(L). The rung selection engine 280 can generate the encoding ladder 172 and the optimized encoded video set 176 in any technically feasible fashion. In some embodiments, the rung selection engine 280 performs any number and/or types of sorting operations on the rung points 298(1)-298(L) prior to generating the encoding ladder 172 and the optimized encoded video set 176. For instance, in some embodiments, the rung selection engine 280 reorders the rung points 298 from the lowest to the highest of the bitrates 254. In the same or other embodiments, the rung selection engine 280 initializes the encoding ladder 172 and the optimized encoded video set 176 to empty sets and then processes each of the rung points 298 as reordered.

To process the rung point 298, the rung selection engine 280 generates the bitrate-resolution pair 174 specifying the bitrate 254 included in the rung point 298 and the resolution 142 included in the rung point 298. The rung selection engine 280 sets the optimized encoded video 178 corresponding to the bitrate-resolution pair 174 equal to the encoded video 258 included in the rung point 298. The rung selection engine 280 then adds the bitrate-resolution pair 174 to the encoding ladder 172 and the optimized encoded video 178 to the optimized encoding video set 176.

As described previously herein in conjunction with FIG. 2, in some embodiments the ladder generator 170 stores the encoding ladder 172 and/or the optimized encoded video set 176 in any number and/or types of memories. In the same or other embodiments, the ladder generator 170 transmits the encoding ladder 172 to any number and/or types of devices and/or software applications. In the same or other embodiments, the ladder generator 170 transmits the optimized encoded video set 176 to any number and/or types of devices and/or software applications.

Advantageously, because the tradeoffs between the bitrate 254 and the visual quality level 256 represented by the encoding ladder 172 are customized based on the complexities of the shots 158, encoding inefficiencies attributable to conventional fixed-bitrate ladders can be reduced. In particular, when the ladder requirement set 124 includes a quality saturation constraint, the rung selection engine 280 ensures that none of the bitrates 254 specified in the encoding ladder 172 exceeds the quality saturation bitrate 292. As a result, for any number of visual quality levels 256, the bitrate 254 of the optimized encoded video 178 selected for streaming based on the encoding ladder 172 can therefore be lower than the bitrate 254 of a conventionally encoded video that is selected for streaming based on a conventional fixed-bitrate ladder.

Furthermore, for each bitrate-resolution pair 174 that corresponds to one of the rung points 298 in the overall convex hull 260, the resolution 142 is optimized with respect to the visual quality level 256. As a result, for any number of bitrates 254, the visual quality level 256 associated with the optimized encoded video 178 selected for streaming based on the encoding ladder 172 can be higher than the visual quality level 256 associated with a conventionally encoded video selected for streaming based on a conventional fixed-bitrate ladder.

Furthermore, irrespective of whether each rung point 298 is in the overall convex hull 260, the visual quality levels 256 associated with the optimized encoded videos 178(1)-178(L) are optimized for the bitrate-resolution pairs 174(1)-174(L), respectively. As a result, the visual quality levels 256 can be increased in resolution-limited scenarios. An example of a resolution-limited scenario is when a streaming session is limited to the resolution 142 of 1920×1080. In a resolution-limited scenario, the visual quality level 256 associated with the optimized encoded video 178 selected for streaming based on the encoding ladder 172 can be increased when the encoding ladder 172 represents a range of visual quality levels 256 for the resolutions 142 that are allowed.

Figure 3:
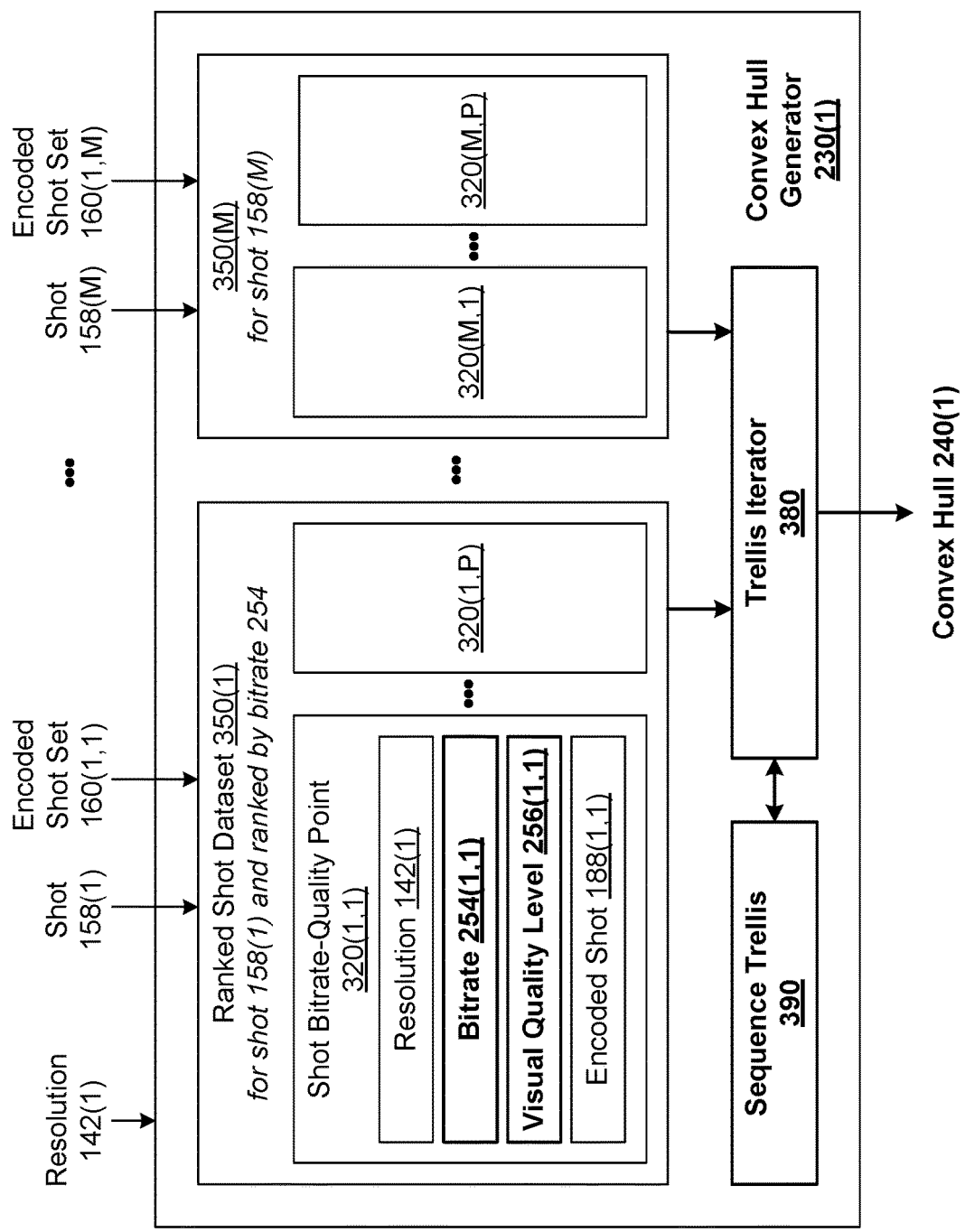
FIG. 3 is a more detailed illustration of one of the convex hull generators of FIG. 2, according to various embodiments.

FIG. 3 is a more detailed illustration of one of the convex hull generators 230 of FIG. 2, according to various embodiments. More specifically, FIG. 3 depicts the convex hull generator 230(1) that generates the convex hull 240(1) based on the resolution 142(1), the shots 158(1)-158(M), and the encoded shot sets 160(1,1)-160(1,M). As described previously herein in conjunction with FIG. 1, the encoded shot sets 160(1,1)-160(1,M) are subsets of the encoded shots 188 that share the resolution 142(1) and correspond to the shots 158(1)-158(M), respectively.

As shown, in some embodiments, the convex hull generator 230(1), generates ranked shot datasets 350(1)-350(M), where M is the number of shots 158, based on the resolution 142(1), the shots 158(1)-158(M), and the encoded shot sets 160(1,1)-160(1,M). For explanatory purposes only, the ranked shot datasets 350(1)-350(M) are also referred to herein individually as "the ranked shot dataset 350" and collectively as "the ranked shot datasets 350."

The ranked shot datasets 350(1)-350(M) are associated with the shots 158(1)-158(M), respectively. Each of the ranked shot datasets 350 includes, without limitation, any number of instances of a shot bitrate-quality point 320 (not explicitly shown), where each instance of the shot bitrate-quality point 320 corresponds to a different one of the encoded shots 188. For explanatory purposes only, instances of the shot bitrate-quality point 320 are also referred to herein individually as "the shot bitrate-quality point 320" and collectively as "the shot bitrate-quality points 320." Furthermore, different instances of the shot bitrate-quality point 320 are labelled using a parenthetical index notation where needed. The parenthetical index notation for the shot bitrate-quality point 320 specifies two comma separated numbers, where the first number is an index into the shots 158 and the second number is an index into the encoding parameter sets 144.

In some embodiments, the ranked shot dataset 350($m$), where m is an integer from 1 to M, includes, without limitation, the shot bitrate-quality points 320($m$,1)-320($m$,P) corresponding to the resolution 142(1), the shot 158($m$) and the encoding parameter sets 144(1)-144(P), respectively. In the same or other embodiments, each of shot bitrate-quality points 320 includes, without limitation, the encoded shot 188 corresponding to the shot bitrate-quality point 320, the resolution 142 of the encoded shot 188, the bitrate 254 of the encoded shot 188, and the visual quality level 256 associated with the encoded shot 188. As shown, because the convex hull generator 230(1) generates the shot bitrate-quality points 320 for the encoded shots 188 having the resolution 142(1), the shot bitrate-quality points 320 generated by the convex hull generator 230(1) share the resolution 142(1).

Referring back to FIG. 2, the ranked shot datasets 350 generated by the convex hull generators 230(2)-240(N) correspond to the resolutions 142(2)-142(N), respectively, instead of the resolution 142(1). Accordingly, the shot bitrate-quality points 320 generated by the convex hull generators 230(2)-240(N) share the resolutions 142(2)-142(N), respectively, instead of the resolution 142(1).

Referring back now to FIG. 3, in some embodiments, the ranked shot dataset 350(1) includes, without limitation, the shot bitrate-quality points 320(1,1)-320(1,P) corresponding to the resolution 142(1), the shot 158(1) and the encoding parameter sets 144(1)-144(P), respectively. And the ranked shot dataset 350(M) includes, without limitation, the shot bitrate-quality points 320(M,1)-320(M,P) corresponding to the resolution 142(1), the shot 158(M) and the encoding parameter sets 144(1)-144(P), respectively. In some other embodiments, the number of encoding parameter sets 144 used to encode each of the shots 158 can vary and therefore the number of shot bitrate-quality points 320 included in each of the ranked shot datasets 350 can vary.

The convex hull generator 230(1) generates each ranked shot dataset 350($m$), where m is an integer from 1 to M, based on the resolution 142(1), the shot 158($m$), and the encoded shot set 160(1,$m$). As described previously herein in conjunction with FIG. 1, the encoded shot set 160(1,$m$) includes, without limitation, the encoded shots 188 generated based on the resolution 142(1), the shot 158($m$), and the encoding parameter sets 144. The convex hull generator 230(1) can generate the ranked shot dataset 350($m$) in any technically feasible fashion.

In some embodiments, for each encoded shot 188 included in the encoded shot set 160(1,$m$), the convex hull generator 230(1) computes the bitrate 254 of and the visual quality level 256 associated with the encoded shot 188 to generate the shot bitrate-quality point 320 corresponding to the encoded shot 188. The convex hull generator 230(1) then reorders the shot bitrate-quality points 320 corresponding to the encoded shots 188 included in the encoded shot set 160(1,m) from the lowest of the bitrates 254 to the highest of the bitrates 254 to generate the ranked shot dataset 350(m).

As noted previously herein, each bitrate 254 specifies an average bitrate. The convex hull generator 230(1) can compute the bitrate 254 of each encoded shot 188 in any technically feasible fashion. For instance, in some embodiments, the convex hull generator 230(1) can divide the total number of bits needed for the resolution 142 of the encoded shot 188 by the length of the shot 158 corresponding to the encoded shot 188 to determine the bitrate 254.

Each visual quality level 256 can be a value for any type of metric that correlates to visual quality in any technically feasible fashion. In some embodiments, each visual quality level 256 is a value for a visual quality metric. Some examples of visual quality metrics include, without limitation, a peak signal-to-noise-ratio, a linear video multimethod assessment fusion ("VMAF") metric, and a harmonic VMAF metric. The linear VMAF metric and the harmonic VMAF metric are also referred to herein individually as "the VMAF metric." The VMAF metric estimates perceptual video quality of reconstructed video content (e.g., the reconstructed shots 198, reconstructed videos, etc.)

In some embodiments, different subsets of the visual quality levels 256 can be computed based on different metrics and/or algorithms. In the same or other embodiments, the visual quality levels 256 are normalized such that the visual quality levels 256 associated with the encoded shots 188 across the resolutions 142(1)-142(N) correlate to visual quality in a consistent fashion. In some embodiments, each visual quality level 256 is replaced with a distortion level and the techniques described herein are modified accordingly.

In some embodiments, to determine the visual quality level 256 associated with a given one of the encoded shots 188, the convex hull generator 230(1) decodes the encoded shot 188 to generate a decoded shot (not shown). The convex hull generator 230(1) then resamples (i.e., upsampled or downsamples) the decoded shot to a target resolution to generate the reconstructed shot 198 that is relevant to the display characteristics of a class of client devices and/or displays. In some embodiments, the target resolution is the same irrespective of the resolution 142 of the encoded shot 188. In some other embodiments, the target resolution can vary based on the resolution 142 of the encoded shot 188, and the visual quality levels 256 can be normalized across the resolutions 142(1)-142(N) in any technically feasible fashion.

Subsequently, the convex hull generator 230(1) analyzes the reconstructed shot 198 and optionally the shot 158 corresponding to the reconstructed shot 198 to determine the visual quality level 256 associated with the encoded shot 188. For instance, in some embodiments, the convex hull generator 230(1) implements a VMAF (or harmonic VMAF) algorithm to compute a VMAF score associated with the encoded shot 188 based on the reconstructed shot 198 derived from the encoded shot 188 and the shot 158 from which the encoded shot 188 was derived. The convex hull generator 230(1) then sets the visual quality level 256 equal to the VMAF score.

To generate the convex hull 240(1), the convex hull generator 230(1) aggregates the shot bitrate-quality points 320 having the resolution 142(1) into video bitrate-quality points 250 that optimize tradeoffs between bitrate 254 and visual quality level 256 for the resolution 142(1). The convex hull generator 230(1) can implement any number and/or type of techniques to aggregate the shot bitrate-quality points 320 having the resolution 142(1) into the video bitrate-quality points 250 that are included in the convex hull 240(1).

More specifically, each of the video bitrate-quality points 250 is associated with a different "trajectory" of the encoding parameter sets 144. For example, the video bitrate-quality point 250(1) could be associated with the QP value of 18 for the shot 158(1), the QP value of 14 for the shot 158(2), the QP value of 14 for the shot 158(3), the QP value of 20 for the shot 158(4), etc. Referring back to FIG. 2, each of the video bitrate-quality points 250(1)-250(V) in the convex hull 240(1) is associated with a different trajectory and therefore there are V different trajectories associated with the convex hull 240(1). In some embodiments, for each video bitrate-quality point 250, the visual quality level 256 is an aggregate of the visual quality levels 256 associated with the encoded shots 188 corresponding to the trajectory of the encoding parameter sets 144. In the same or other embodiments, for each video bitrate-quality point 250, the bitrate 254 is an average of the bitrates 254 of the encoded shots 188 corresponding to the trajectory of the encoding parameter sets 144.

As shown, in some embodiments, the convex hull generator 230(1) configures the trellis iterator 380 to generate the convex hull 240(1) based on the ranked shot datasets 350(1)-350(M). As described in detail below in conjunction with FIGS. 4A-4D, the trellis iterator 380 iteratively updates a sequence trellis 390 based on the ranked shot datasets 350(1)-350(M) to generate the video bitrate-quality points 250 that are included in the convex hull 240(1). The trellis iterator 380 is a software module, and the sequence trellis 390 is a data structure that is described in greater detail below in conjunction with FIGS. 4A-4D.

Referring back to FIG. 2, in some embodiments, the convex hull generators 230(1)-230(N) use any number of instances of the trellis iterator 380 to generate the convex hulls 240(1)-230(N), respectively, based on the ranked shot datasets 350 for the resolutions 142(1)-142(N), respectively.

Generating Convex Hulls of Video Bitrate-Quality Points and an Overall Convex Hull of Video Bitrate-Quality Points FIGS. 4A-4D are more detailed illustrations of how the trellis iterator 380 of FIG. 3 generates the convex hull 240(1) based on the ranked shot datasets 350(1)-350(M), according to various embodiments. For explanatory purposes only, the functionality of the trellis iterator 380 is described in FIGS. 4A-4D in the context of generating the convex hull 240(1) for the resolution 142(1) for the depicted embodiment.

As shown in FIGS. 4A-4D, the sequence trellis 390 includes, without limitation, a shot axis 410 and a bitrate axis 430. The sequence trellis 390 also includes, without limitation, M columns that each correspond to a different one of the ranked shot datasets 350 for the resolution 142(1) and therefore to a different one of the shots 158(1)-158(M). For an integer m from 1 to M, the $m^{th}$ column includes, without limitation, the shot bitrate-quality points 320 included in the ranked shot dataset 350 corresponding to the combination of the resolution 142(1) and the shot 158(m).

The shot bitrate-quality points 320 included in each column are ranked as per the ranked shot dataset 350. More specifically, the shot bitrate-quality points 320 included in each column are ranked from the lowest of the bitrates 254 to the highest of the bitrates 254 (and, by construction, from the lowest of the visual quality levels 256 to the highest of the visual quality levels 256). In some embodiments, the shot bitrate-quality points 320 included in each column have positive slopes that—in magnitude—are increasing as a function of the bitrate 254.

For convenience, the shot bitrate-quality points 320 included in the sequence trellis 390 are depicted as circles labelled with a pair of numbers, where each pair of numbers represents a different one of the shot bitrate-quality points 320 according to the index notation described previously herein in conjunction with FIG. 3. Referring back to FIG. 3, for each of the shot bitrate-quality points 320, the first number is an index into the ranked shot datasets 350 and therefore into the shots 158. The second number is an index into the bitrate ranking of the shot bitrate-quality point 320 within the ranked shot dataset 350 specified by the first number. In some embodiments, for an integer m from 1 to M and an integer p from 1 to P, the shot bitrate-quality point 320($m, p$) corresponds to the shot 158($m$) and the $p^{th}$ lowest of the bitrates 254 included in the ranked shot dataset 350($m$).

For explanatory purposes only, in the embodiment depicted in FIGS. 4A-4D, the number of shots 158 is equal to five, and the number of encoding parameter sets 144 is equal to four. In some other embodiments, the number of shots 158 and the number of encoding parameter sets 144 can be any positive integers. In the same or other embodiments, the number of encoding parameter sets 144 used to generate the ranked shot dataset 350 for each shot 158 and/or each resolution 142 can vary. Consequently, the number of shot bitrate-quality points 320 included in each column of the sequence trellis 390 can vary.

In the embodiment depicted in FIG. 4A-4D, the shot bitrate-quality point 320(1,1) corresponds to the shot 158(1) and the lowest of the bitrates 254 included in the ranked shot dataset 350(1). In another example, the shot bitrate-quality point 320(5,4) corresponds to the shot 158(5) and the fourth-lowest of the bitrates 254 (in this case the highest of the bitrates 254) included in the ranked shot dataset 350(5).

As previously described in conjunction with FIG. 3, each of the shot bitrate-quality points 320 includes, without limitation, a different one of the encoded shots 188. The trellis iterator 380 generates each of the video bitrate-quality points 250 that is in the convex hull by 240(1) by selecting combinations of the shot bitrate-quality points 320 such that each of the shots 158 is associated with one of the encoded shots 188. The trellis iterator 380 implements the sequence trellis 390 to iteratively perform this combining technique, generating a different one of the video bitrate-quality points 250 during each iteration.

Each of FIGS. 4A-4D illustrates a different version of the sequence trellis 390 generated by the trellis iterator 380 at a different iteration. FIG. 4A illustrates the sequence trellis 390(1) in an initial state. Here, the trellis iterator 380 selects the shot bitrate-quality points 320(1,1), 320(2,1), 320(3,1), 320(4,1), and 320(5,1). Each of the shot bitrate-quality points 320 included in this initially selected combination have the lowest bitrate 254 and lowest visual quality levels 256, and therefore reside at the bottom of the respective columns.

The trellis iterator 380 sequentially aggregates the encoded shots 188(1,1), 188(2,1), 188(3,1), 188(4,1), and 188(5,1) included in the shot bitrate-quality points 320(1,1), 320(2,1), 320(3,1), 320(4,1), and 320(5,1), respectively, to generate the encoded video 258(1) included in the video bitrate-quality point 250(1). In addition, the trellis iterator 380 computes the bitrate 254(1) included in the video bitrate-quality point 250(1) based on the lengths of the shots 158(1)-158(5) and the bitrates 254 included in the shot bitrate-quality points 320(1,1), 320(2,1), 320(3,1), 320(4,1), and 320(5,1), respectively. The trellis iterator 380 also computes the visual quality level 256(1) included in the video bitrate-quality point 250(1) based on the lengths of the shots 158(1)-158(5) and the visual quality levels 256 included in the shot bitrate-quality points 320(1,1), 320(2,1), 320(3,1), 320(4,1), and 320(5,1), respectively. The trellis iterator 380 can compute the visual quality level 256(1) in any technically feasible fashion.

The trellis iterator 380 then computes, for each of the shot bitrate-quality points 320(1,1), 320(2,1), 320(3,1), 320(4,1), and 320(5,1) in the initially selected combination, the rate of change of the visual quality level 256 with respect to the bitrate 254 between the shot bitrate-quality point 320 and the above-neighbor of the shot bitrate-quality point 320. As shown in FIG. 4A, in some embodiments, the trellis iterator 380 computes the rate of change of the visual quality level 256 with respect to the bitrate 254 between the shot bitrate-quality points 320(1,1) and 320(1,2), 320(2,1) and 320(2,2), 320(3,1) and 320(3,2), 320(4,1) and 320(4,2), and 320(5,1) and 320(5,2). Notably, the computed rate of change for the shot bitrate-quality point 320 associated with a particular one of the shots 158 represents the derivative of a bitrate-quality curve (not shown) associated with that shot 158, taken at the shot bitrate-quality point 320.

As shown, in some embodiments, the trellis iterator 380 selects the derivative having the greatest magnitude, and then selects the above neighbor associated with that derivative to generate the subsequent one of the video bitrate-quality points 250. As shown in FIG. 4B, in some embodiments, the trellis iterator 380 determines that the derivative associated with shot bitrate-quality point 320(4,1) is greatest, and therefore selects the shot bitrate-quality point 320(4,2) (the above-neighbor of the shot bitrate-quality point 320(4,1)) to generate the video bitrate-quality point 250(1).

The trellis iterator 380 sequentially aggregates the encoded shots 188(1,1), 188(2,1), 188(3,1), 188(4,2), and 188(5,1) included in the shot bitrate-quality points 320(1,1), 320(2,1), 320(3,1), 320(4,2), and 320(5,1), respectively, to generate the encoded video 258(2) included in the video bitrate-quality point 250(2). In addition, the trellis iterator 380 computes the bitrate 254(2) included in the video bitrate-quality point 250(2) based on the lengths of the shots 158(1)-158(5) and the bitrates 254 included in the shot bitrate-quality points 320(1,1), 320(2,1), 320(3,1), 320(4, 2), and 320(5,1), respectively. The trellis iterator 380 also computes the visual quality level 256(2) included in the video bitrate-quality point 250(2) based on the lengths of the shots 158(1)-158(5) and the visual quality levels 256 included in the shot bitrate-quality points 320(1,1), 320(2,1), 320(3,1), 320(4,2), and 320(5,1), respectively.

The trellis iterator 380 performs this technique iteratively, thereby ascending the sequence trellis 390, as shown in FIGS. 4C-4D. As shown in FIG. 4C, in some embodiments, the trellis iterator 380 determines that the derivative associated with the shot bitrate-quality point 320(1,1) is greatest compared to other derivatives, and therefore selects the shot bitrate-quality point 320(1,2) to generate the video bitrate-quality point 250(3).

In some embodiments, the trellis iterator 380 continues this process until, as shown in FIG. 4D, the trellis iterator 380 generates the video bitrate-quality point 250(16) based on the shot bitrate-quality points 320(1,4), 320(2,4), 320(3, 4), 320(4,4), and 320(5,4). In this manner, the trellis iterator 380 incrementally improves the encoded video 258(1) by selecting a single one of the shot bitrate-quality points 320 for which both the bitrate 254 and the visual quality level 256 are increased at each iteration. As a result, the convex hull 240(1) corresponds to a collection of the encoded videos 258 with increasing bitrate 254 and increasing visual quality level 256.

In some embodiments, the trellis iterator 380 generates and adds any number of shot bitrate-quality points 320 to the sequence trellis 390 prior to ascending the sequence trellis 390 in order to create a terminating condition. In doing so, the trellis iterator 380 can duplicate the shot bitrate-quality points 320 having the highest of the bitrates 254 for each of the ranked shot datasets 350 to cause the rate of change between the second to last and the last of the shot bitrate-quality points 320 to be zero. When the trellis iterator 380 detects these zero rates of change for all of the shots 158, i.e., when the maximum magnitude of rate of change is exactly zero, the trellis iterator 380 identifies the terminating condition and stops iterating.

Figure 5A:
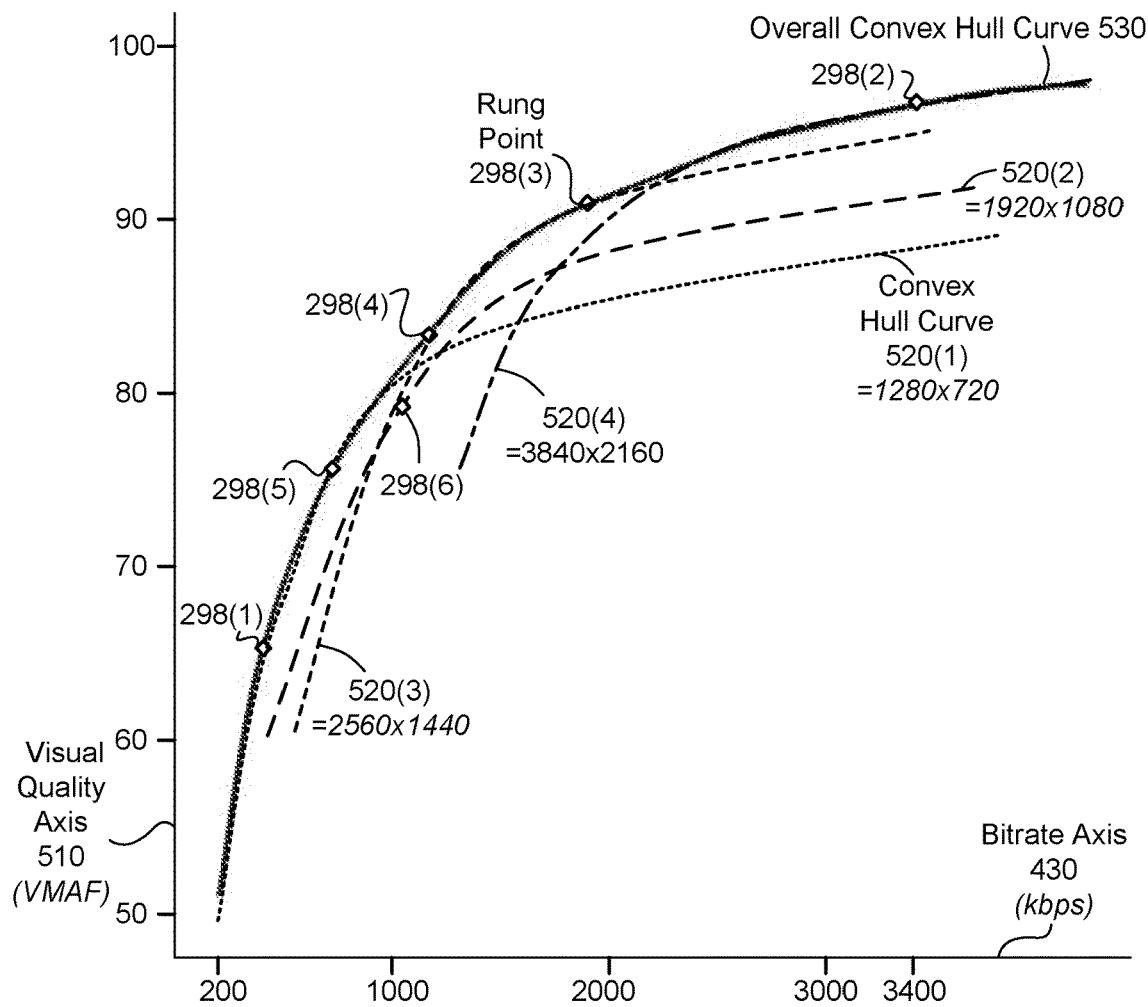
FIG. 5A illustrates an overall convex hull that is generated by the ladder generator of FIG. 2 based on multiple different convex hulls, according to various embodiments.

FIG. 5A illustrates the overall convex hull 260 that is generated by the ladder generator of FIG. 2 based on multiple different convex hulls 240, according to various embodiments. For explanatory purposes only, in the embodiment depicted in FIG. 5A, the number of resolutions 142 is four, and the resolutions 142(1)-142(4) are 1280×720, 1920×1080, 2560×1440, and 3840×2160, respectively. The convex hulls 240(1)-240(4) correspond to the resolutions 142(1)-142(4), respectively. In some other embodiments, the number of resolutions 142 (and therefore the number of convex hulls 240) can be any positive integer, and the resolutions 142 can vary from what is depicted in FIG. 5A.

For explanatory purposes only, the convex hulls 240(1)-240(4) are depicted in FIG. 5A via convex hull curves 520(1)-520(4), respectively. As described previously herein in conjunction with FIG. 2, in some embodiments, the ladder generator 170 plots the video bitrate-quality points 250 in the convex hulls 240(1)-240(4) against the bitrate axis 430 and a visual quality axis 510 to generate the convex hull curves 520(1)-520(4), respectively. As shown, in some embodiments, the bitrates 254 are specified in kbps, and the visual quality levels are values of a VMAF metric.

In the same or other embodiments, the ladder generator 170 evaluates the video bitrate-quality points 250 along the convex hull curves 520(1)-520(4) to determine the overall convex hull 260. More specifically, the ladder generator 170 identifies the subset of the video bitrate-quality points 250 across all the convex hull curves that form a boundary where all the video bitrate-quality points 250 reside on one side of the boundary and also are such that connecting any two consecutive video bitrate-quality points 250 included in the identified subset with a straight line leaves all the video bitrate-quality points 250 that are not included in the identified subset on the same side of the line. The overall convex hull 260 is the identified subset of the video bitrate-quality points 250. In some other embodiments, the ladder generator 170 can generate the overall convex hull 260 based on the convex hulls 240 in any technically feasible fashion.

For explanatory purposes only, the overall convex hull 260 is depicted in FIG. 5A via an overall convex hull curve 530. In some embodiments, the ladder generator 170 or the rung selection engine 280 plots the video bitrate-quality points 250 in the overall convex hull 260 against the bitrate axis 430 and the visual quality axis 510, to generate the overall convex hull curve 530. The overall convex hull curve 530 depicts the overall shape defined by the video bitrate-quality points 250 in the overall convex hull 260.

Generating an Encoding Ladder

Figure 5B:
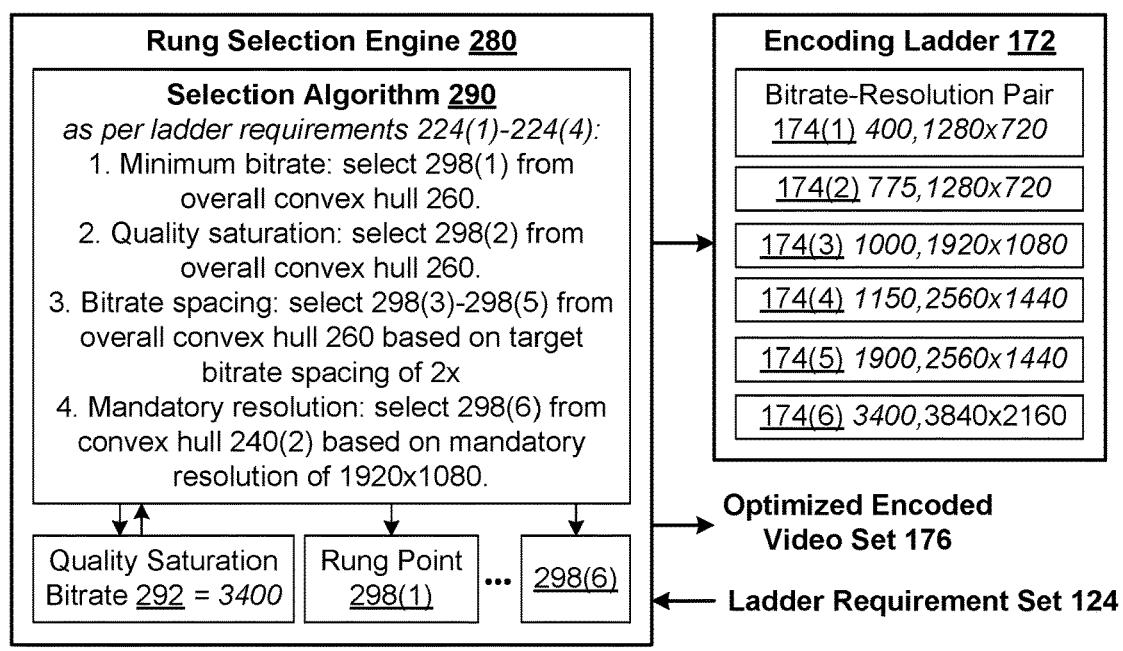
FIG. 5B illustrates how the rung selection engine of FIG. 2 generates an encoding ladder based on an overall convex hull, multiple different convex hulls, and a ladder requirement set, according to various embodiments.

FIG. 5B illustrates how the rung selection engine 280 of FIG. 2 generates the encoding ladder 172 based on the overall convex hull 260, multiple different convex hulls 240, and the ladder requirement set 124, according to various embodiments. For explanatory purposes only, in the embodiment depicted in FIG. 5B, the rung selection engine 280 generates the encoding ladder 172 based on the overall convex hull 260 represented via the overall convex hull curve 530 of FIG. 5A, the convex hulls 240(1)-240(4) represented via the convex hull curves 520(1)-520(4), respectively of FIG. 5A, and the ladder requirement set 124.

Based on the overall convex hull 260, the rung selection engine 280 can select, for a target bitrate (not shown), the video bitrate-quality point 250 that maximizes the visual quality level 256. Conversely, the rung selection engine 280 can select, for a target visual quality level (not shown), the video bitrate-quality point 250 that minimizes the bitrate 254 for the target visual quality level.

In a complementary fashion, based on the convex hulls 240(1)-240(4), the rung selection engine 280 can select, for a target bitrate, the video bitrate-quality points 250 that maximize the visual quality level 256 for the resolutions 142 of 1280×720, 1920×1080, 2560×1440, and 3840×2160, respectively. Conversely, based on the convex hulls 240(1)-240(4), the rung selection engine 280 can select, for a target visual quality level, the video bitrate-quality points 250 that maximize the bitrate 254 for the resolutions 142 of 1280×720, 1920×1080, 2560×1440, and 3840×2160, respectively.

As described previously herein in conjunction with FIG. 3, the selection algorithm 290 included in the rung selection engine 280 selects the rung points 298 based on the ladder requirements 224 included in the ladder requirement set 124. Although not shown, in the embodiment depicted in FIG. 5, the ladder requirement set 124 includes, without limitation, the ladder requirements 224(1)-224(4). In some other embodiments, the number of ladder requirements 224 can be any positive integer and the ladder requirements 224 can vary.

For explanatory purposes only, the ladder requirement 224(1) is a minimum bitrate requirement specifying a minimum allowed bitrate of 400 kbps. Based on the ladder requirement 224(1) and the overall convex hull curve 530, the selection algorithm 290 determines the rung point 298(1) having the bitrate 254 of 400 kbps from the overall convex hull 260. Note that the rung point 298(1) is also in the convex hull 240(1) for the resolution 142(1) of 1280×720.

The ladder requirement 224(2) is a quality saturation requirement specifying a highest allowed bitrate of 20000 kbps. As part of processing the ladder requirement 224(2), the selection algorithm 290 computes the quality saturation bitrate 292 of 3400 kbps. Since the quality saturation bitrate 292 is lower than the highest allowed bitrate, the selection algorithm 290 determines the rung point 298(2) based on the ladder requirement 224(2), the overall convex hull curve 530, and the quality saturation bitrate 292. As shown, the selection algorithm 290 determines the rung point 298(2) having the bitrate 254 of 3400 kbps from the overall convex hull 260. Note that the rung point 298(2) is also in the convex hull 240(4) for the resolution 142(4) of 3840×2160.

The ladder requirement 224(3) is a bitrate spacing requirement. The selection algorithm 290 computes a midpoint bitrate (not shown) of 1900 kbps based on the rung point 298(1) and the rung point 298(2) and then determines the rung point 298(3) having the bitrate 254 of 1900 kbps from the overall convex hull 260. The selection algorithm 290 computes a new midpoint bitrate of 1150 kbps based on the rung points 298(1) and 298(3) and then determine the rung point 298(4) having the bitrate 254 of 1150 from the overall convex hull 260. The selection algorithm 290 computes a new midpoint bitrate of 775 kbps based on the rung points 298(1) and 298(4) and then determines the rung point 298(5) having the bitrate 254 of 775 kbps from the overall convex hull 260. The selection algorithm 290 then determines that then rung points 298(1)-298(5) collectively satisfy the ladder requirement 224(3). Note that the rung points 298(3) and 298(4) are also in the convex hull 240(3) for the resolution 142(3) of 2560×1440 and the rung point 298(5) is also in the convex hull 240(1) for the resolution 142(1) of 1280×720.

The ladder requirement 224(4) is a mandatory resolution requirement specifying that the resolution 142(2) of 1920× 1080 is mandatory. Because none of the rung points 298(1)-298(5) satisfy the ladder requirement 224(4), the selection algorithm 290 evaluates the overall convex hull 260 to determine whether any of the video bitrate-quality points 250 included in the overall convex hull 260 has the resolution 142(2). Because none of the video bitrate-quality points 250 included in the overall convex hull 260 has the resolution 142(2), the selection algorithm 290 determines the rung point 298(6) from the convex hull 240(2) for the resolution 142(2) of 1920×1080. More precisely, the selection algorithm 290 determines the rung point 298(6) having the bitrate 254 of 1000 that lies closest to the portion of the overall convex hull 260 between the rung point 298(1) and the rung point 298(2).

The rung selection engine 280 reorders the rung points 298(1)-298(6) from the lowest of the bitrates 254 to the highest of the bitrates 254 to generate an ordered set of rung points 298. Based on the ordered set of rung points 298, the rung selection engine 280 generates the encoding ladder 172 that includes, without limitation, the bitrate-resolution pairs 174(1)-174(6) corresponding to the rung points 298(1), 298(5), 298(6), 298(4), 298(3), 298(2). The rung selection engine 280 also determines the optimized encoded video set 176 that includes, without limitation, the optimized encoded videos 178(1)-178(6) corresponding to the rung points 298 (1), 298(5), 298(6), 298(4), 298(3), 298(2), respectively As shown, the bitrate-resolution pairs 174(1) and 172(2) share the resolution 142(1) of 1280×720 and have the bitrates 254 of 400 kbps and 775 kbps, respectively. The bitrate-resolution pair 174(3) has the resolution 142(2) of 1920×1080 and the bitrate 254 of 1000 kbps. The bitrate-resolution pairs 174(4) and 172(5) share the resolution 142(3) of 2560×1440 and have the bitrates 254 of 1150 kbps and 1900 kbps, respectively. The bitrate-resolution pair 174(6) has the resolution 142(4) of 3840×2160 and the bitrate 254 of 3400 kbps.

Figure 6:
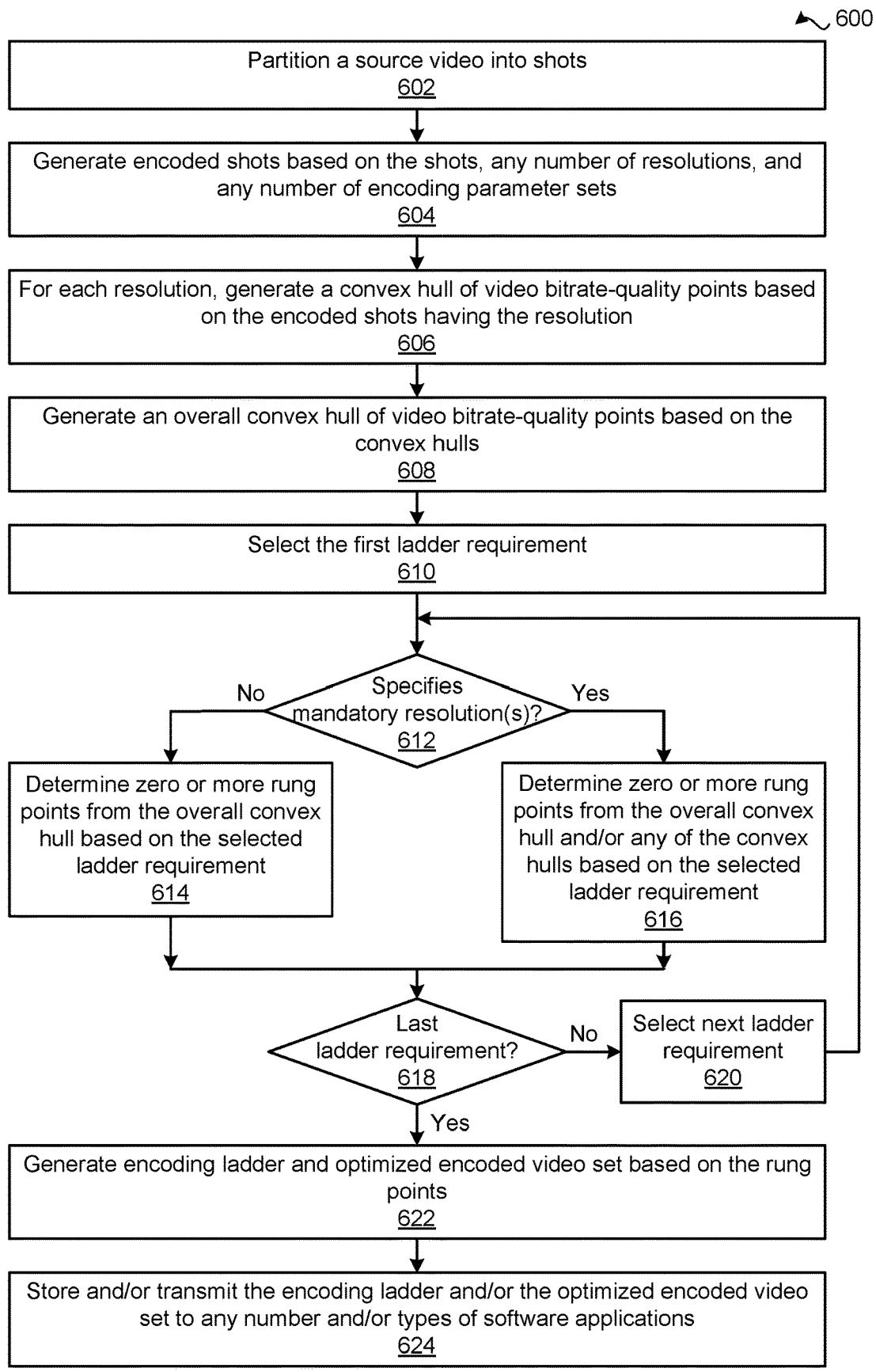
FIG. 6 is a flow diagram of method steps for generating an encoding ladder for a media title, according to various embodiments.

FIG. 6 is a flow diagram of method steps for generating an encoding ladder for a media title, according to various embodiments. Although the method steps are described with reference to the systems of FIGS. 1-5, persons skilled in the art will understand that any system configured to implement the method steps, in any order, falls within the scope of the present invention.

As shown, a method 600 begins at step 602, where the shot encoding engine 140 partitions the source video 122 corresponding to the media title into the shots 158. At step 604, the shot encoding engine 140 generates the encoded shots 188 based on the shots 158, the resolutions 142, and the encoding parameter sets 144. At step 606, for each of the resolutions 142, the ladder generator 170 generates the convex hull 240 of video bitrate-quality points 250 for the resolution 142 based on the encoded shots 188 having the resolution 142. At step 608, the ladder generator 170 generates the overall convex hull of video bitrate-quality points 250 based on the convex hulls 240.

At step 610, the selection algorithm 290 selects the first of the ladder requirements 224. At step 612, the selection algorithm 290 determines whether the selected ladder requirement 224 specifies any mandatory resolutions. If, at step 612, the selection algorithm 290 determines that the selected ladder requirement 224 does not specify any mandatory resolutions, then the method 600 proceeds to step 614. At step 614, the selection algorithm 290 determines zero or more rung points 298 from the overall convex hull 260 based on the selected ladder requirement 224. The method 600 then proceeds directly to step 618.

If, however, at step 612, the selection algorithm 290 determines that the selected ladder requirement 224 specifies at least one mandatory resolution, then the method 600 proceeds directly to step 616. At step 616, the selection algorithm 290 determines zero or more rung points 298 from the overall convex hull 260 and/or any of the convex hulls 240 based on the selected ladder requirement 224.

At step 618, the selection algorithm 290 determines whether the selected ladder requirement 224 is the last of the ladder requirements 224. If, at step 618, the selection algorithm 290 determines that the selected ladder requirement 224 is not the last of the ladder requirements 224, then the method 600 proceeds to step 620. At step 620, the selection algorithm 290 selects the next of the ladder requirements 224, and the method 600 returns to step 612, where the selection algorithm 290 determines whether the selected ladder requirement 224 specifies any mandatory resolutions.

If, however, at step 618, the selection algorithm 290 determines that the selected ladder requirement 224 is the last of the ladder requirements 224, then the method 600 proceeds directly to step 622.

At step 622, the ladder generator 170 generates the encoding ladder 172 and the optimized encoded video set 176 based on the rung points 298. At step 624, the rung selection engine 280 stores and/or transmits the encoding ladder 172 and/or the optimized encoded video set 176 to any number and/or types of software applications. The method 600 then terminates.

In sum, the disclosed techniques can be used to efficiently generate an encoding ladder that is customized for a media title based on a ladder requirement set. In some embodiments, an encoding ladder application partitions a source video corresponding to the media title into different shots. The encoding ladder application encodes each shot across a set of resolutions and multiple different encoding parameter sets (e.g., QP value) to generate encoded shots. For each resolution, the encoding ladder application generates a convex hull of bitrate-quality points based on the encoded shots corresponding to the resolution.

To generate the convex hull for a given resolution, the encoding ladder application computes a different shot bitrate-quality point for encoded shot corresponding to the resolution. Each shot bitrate-quality point specifies, without limitation, a different encoded shot and the corresponding resolution, bitrate, and visual quality level. The encoding ladder application performs optimization operations to aggregate the shot bitrate-quality points having the resolution into video bitrate-quality points included in the convex hull. The convex hull optimizes tradeoffs between bitrate and visual quality level for the resolution. Each of the video bitrate-quality points specifies a different encoded video and the corresponding resolution, bitrate, and visual quality level. Notably, the resolution across each of the encoded videos is constant, but the bitrate and visual quality level can vary.

Subsequently, the encoding ladder application generates an overall convex hull of video bitrate-quality points based on the convex hulls for the different resolutions. Each of the video bitrate-quality points in the overall convex hull corresponds to a different encoded video having a different bitrate and a resolution that optimizes the visual quality level of the encoded video at the bitrate.

To generate the encoding ladder, the encoding ladder application processes each ladder requirement in the order specified in the ladder requirement set to determine any number of rung points that are each equal to a different video bitrate-quality point. To process a given ladder requirement, the ladder generator determines any number (including none) of rung points for the ladder requirement such that the rung points for the ladder requirement and the rung points for any preceding ladder requirements collectively satisfy the ladder requirement. If a given ladder requirement does not specify any mandatory resolutions, then the ladder generator determines rung point(s) for the ladder requirement from the overall convex hull. Otherwise, the ladder generator determines rung point(s) for the ladder requirement preferentially from the overall convex hull and, if necessary, from one of the convex hulls.

After processing the ladder requirements, the encoding ladder application generates the encoding ladder that includes, without limitation, bitrate-resolution pairs corresponding to the rung points. Each of the bitrate-resolution pairs specifies the bitrate and resolution of a different "optimized" encoded video, where the bitrate and visual quality level but not the resolution can vary across the encoded shots of the optimized encoded video. The encoding ladder application also generates an optimized encoded video set that includes, without limitation, the optimized encoded videos corresponding to the rung points. The encoding ladder application stores and/or transmits the encoding ladder to any number of client devices for use by any number and/or types of endpoint applications. The encoding ladder application also stores and/or transmits the optimized encoded video set to a content delivery network.

At least one technical advantage of the disclosed techniques relative to the prior art is that a different encoding ladder is automatically generated for each media title included in a given library of media titles based on the complexity of each shot included in the source video corresponding to that media title. Accordingly, with the disclosed techniques, the tradeoffs between bitrate and visual quality represented by each encoding ladder are customized for a given media title. Consequently, the encoding inefficiencies attributable to conventional fixed-bitrate ladders can be reduced. In particular, the disclosed techniques ensure that none of the bitrates specified in a given encoding ladder exceed the quality saturation bitrate of the corresponding source video and that the resolutions of any number of bitrate-resolution pairs in a given encoding ladder are properly optimized with respect to visual quality. These technical advantages provide one or more technological advancements over prior art approaches.

1. In some embodiments, a computer-implemented method for generating encoding ladders for encoding media titles comprises generating a first convex hull representing encoding tradeoffs between quality and bitrate when encoding a media title at a first resolution, generating a second convex hull representing encoding tradeoffs between quality and bitrate when encoding the media title at a second resolution, determining an overall convex hull based on the first convex hull and the second convex hull, and generating an encoding ladder for the media title based on at least the overall convex hull and a first ladder requirement.

2. The computer-implemented method of clause 1, wherein generating the encoding ladder comprises determining a plurality of encoded videos based on the overall convex hull and the first ladder requirement, and generating a plurality of bitrate-resolution pairs based on the plurality of encoding videos, wherein each of the bitrate-resolution pairs specifies an average bitrate and a resolution of a different encoded video included in the plurality of encoded videos.

3. The computer-implemented method of clauses 1 or 2, wherein the first ladder requirement comprises a quality saturation requirement, and generating the encoding ladder comprises computing a quality saturation bitrate based on the overall convex hull, selecting a first video bitrate-quality point associated with a first encoded video from the overall convex hull based on the quality saturation bitrate, generating a first bitrate-resolution pair that specifies an average bitrate of the first encoded video and a resolution of the first encoded video, and aggregating the first bitrate-resolution pair with a plurality of bitrate-resolution pairs associated with at least a second ladder requirement to generate a portion of the encoding ladder.

4. The computer-implemented method of any of clauses 1-3, wherein generating the encoding ladder comprises selecting a plurality of video bitrate-quality points from the overall convex hull based on a target bitrate spacing specified in the first ladder requirement, and generating a plurality of bitrate-resolution pairs associated with a plurality of encoded videos based on the plurality of video bitrate-quality points.

5. The computer-implemented method of any of clauses 1-4, wherein generating the encoding ladder comprises determining that none of a plurality of video bitrate-quality points in the overall convex hull satisfies the first ladder requirement, selecting at least one video bitrate-quality point from the first convex hull based on the first ladder requirement, and generating at least one bitrate-resolution pair associated with at least one encoded video based on the least one video bitrate-quality point, and aggregating the at least one bitrate-resolution pair and a plurality of bitrate-resolution pairs generated based on the overall convex hull to generate a portion of the encoding ladder.

6. The computer-implemented method of any of clauses 1-5, wherein the first convex hull includes a first set of video bitrate-quality points, the second convex hull includes a second set of video bitrate-quality points, and the overall convex hull includes at least a first subset of the first set of video bitrate-quality points and a second subset of the second set of video bitrate-quality points.

7. The computer-implemented method of any of clauses 1-6, wherein generating the first convex hull comprises encoding each shot included in the media title at the first resolution and across a plurality of encoding parameter sets to generate a plurality of encoded shots, performing one or more optimization operations based on the plurality of encoded shots and a visual quality metric to generate a plurality of encoded videos, and computing a plurality of video bitrate-quality points based on the plurality of encoded videos.

8. The computer-implemented method of any of clauses 1-7, wherein the visual quality metric comprises a video multimethod assessment fusion metric that estimates perceptual video quality.

9. The computer-implemented method of any of clauses 1-8, wherein the first ladder requirement specifies at least one of a minimum allowed bitrate, a maximum allowed bitrate, a target bitrate spacing, a minimum visual quality level, or a mandatory resolution.

10. The computer-implemented method of any of clauses 1-9, wherein a bitrate varies across a first encoded video associated with a first bitrate-resolution pair included in the encoding ladder.

11. In some embodiments, one or more non-transitory computer readable media include instructions that, when executed by one or more processors, cause the one or more processors to generate encoding ladders for encoding media titles by performing the steps of generating a plurality of convex hulls, wherein each convex hull included in the plurality of convex hulls represents encoding tradeoffs between quality and bitrate when encoding a media title at a different resolution, determining an overall convex hull based on the plurality of convex hulls, and generating an encoding ladder for the media title based on at least the overall convex hull and a first ladder requirement.

12. The one or more non-transitory computer readable media of clause 11, wherein the encoding ladder comprises a plurality of bitrate-resolutions pairs that are associated with a plurality of encoded videos.

13. The one or more non-transitory computer readable media of clauses 11 or 12, wherein the first ladder requirement comprises a quality saturation requirement, and generating the encoding ladder comprises computing a quality saturation bitrate based on the overall convex hull, selecting a first video bitrate-quality point associated with a first encoded video from the overall convex hull based on the quality saturation bitrate, generating a first bitrate-resolution pair that specifies an average bitrate of the first encoded video and a resolution of the first encoded video, and aggregating the first bitrate-resolution pair with a plurality of bitrate-resolution pairs associated with at least a second ladder requirement to generate a portion of the encoding ladder.

14. The one or more non-transitory computer readable media of any of clauses 11-13, wherein generating the encoding ladder comprises selecting a plurality of video bitrate-quality points from the overall convex hull based on a target bitrate spacing specified in the first ladder requirement, and generating a plurality of bitrate-resolution pairs associated with a plurality of encoded videos based on the plurality of video bitrate-quality points.

15. The one or more non-transitory computer readable media of any of clauses 11-14, wherein generating the encoding ladder comprises determining that none of a plurality of video bitrate-quality points in the overall convex hull satisfies the first ladder requirement, selecting at least one video bitrate-quality point from a first convex hull included in the plurality of convex hulls based on the first ladder requirement, and generating at least one bitrate-resolution pair associated with at least one encoded video based on the least one video bitrate-quality point, and aggregating the at least one bitrate-resolution pair and a plurality of bitrate-resolution pairs generated based on the overall convex hull to generate a portion of the encoding ladder.

16. The one or more non-transitory computer readable media of any of clauses 11-15, wherein determining the overall convex hull based on the plurality of convex hulls comprises determining a union of video bitrate-quality points included in the plurality of convex hulls, identifying a boundary associated with the union of video bitrate-quality points, wherein no video bitrate-quality point included in the union of video bitrate-quality points is located on a first side of the boundary, and discarding any video bitrate-quality point included in the union of video bitrate-quality points that is not located along the boundary.

17. The one or more non-transitory computer readable media of any of clauses 11-16, wherein generating the plurality of convex hulls comprises encoding each shot included in the media title at a first resolution and across a plurality of encoding parameter sets to generate a plurality of encoded shots, performing one or more optimization operations based on the plurality of encoded shots and a visual quality metric to generate a plurality of encoded videos, and computing a plurality of video bitrate-quality points based on the plurality of encoded videos to generate a first convex hull included in the plurality of convex hulls.

18. The one or more non-transitory computer readable media of any of clauses 11-17, wherein the first ladder requirement specifies at least one of a minimum allowed bitrate, a maximum allowed bitrate, a target bitrate spacing, a minimum visual quality level, or a mandatory resolution.

19. The one or more non-transitory computer readable media of any of clauses 11-18, wherein a first encoded video associated with a first bitrate-resolution pair included in the encoding ladder comprises at least a first encoded shot that is generated based on a first encoding parameter and at least a second encoded shot that is generated based on a second encoding parameter.

20. In some embodiments, a system comprises one or more memories storing instructions and one or more processors coupled to the one or more memories that, when executing the instructions, perform the steps of generating a first convex hull based on a visual quality metric and a first plurality of encoded shots associated with both a media title and a first resolution, generating a second convex hull based on the visual quality metric and a second plurality of encoded shots associated with both the media title and a second resolution, determining an overall convex hull based on the first convex hull and the second convex hull, and generating an encoding ladder for the media title based on a first ladder requirement and at least one of the overall convex hull, the first convex hull, or the second convex hull.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits.

Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, a Flash memory, an optical fiber, a portable compact disc read-only memory, an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating encoding ladders for encoding media titles, the method comprising:
   receiving a plurality of encodings of a media title having different resolutions;
   generating a first convex hull of points for a first set of encodings included in the plurality of encodings of the media title, wherein each point included in the first convex hull of points represents an encoding included in the first set of encodings having a same first resolution, wherein the first convex hull of points represents encoding tradeoffs between quality and bitrate when encoding the media title at the same first resolution;
   generating a second convex hull of points for a second set of encodings included in the plurality of encodings of the media title, wherein each point included in the second convex hull of points represents an encoding included in the second set of encodings having a same second resolution, wherein the second convex hull of points represents encoding tradeoffs between quality and bitrate when encoding the media title at the same second resolution;
   determining an overall convex hull based on the first convex hull of points and the second convex hull of points; and
   generating an encoding ladder for the media title based on at least the overall convex hull and a first ladder requirement.

2. The computer-implemented method of claim 1, wherein generating the encoding ladder comprises:
   determining a plurality of encoded videos based on the overall convex hull and the first ladder requirement; and
   generating a plurality of bitrate-resolution pairs based on the plurality of encoding videos, wherein each of the bitrate-resolution pairs specifies an average bitrate and a resolution of a different encoded video included in the plurality of encoded videos.

3. The computer-implemented method of claim 1, wherein the first ladder requirement comprises a quality saturation requirement, and generating the encoding ladder comprises:
   computing a quality saturation bitrate based on the overall convex hull;
   selecting a first video bitrate-quality point associated with a first encoded video from the overall convex hull based on the quality saturation bitrate;
   generating a first bitrate-resolution pair that specifies an average bitrate of the first encoded video and a resolution of the first encoded video; and
   aggregating the first bitrate-resolution pair with a plurality of bitrate-resolution pairs associated with at least a second ladder requirement to generate a portion of the encoding ladder.

4. The computer-implemented method of claim 1, wherein generating the encoding ladder comprises:
   selecting a plurality of video bitrate-quality points from the overall convex hull based on a target bitrate spacing specified in the first ladder requirement; and
   generating a plurality of bitrate-resolution pairs associated with a plurality of encoded videos based on the plurality of video bitrate-quality points.

5. The computer-implemented method of claim 1, wherein generating the encoding ladder comprises:
determining that none of a plurality of video bitrate-quality points in the overall convex hull satisfies the first ladder requirement;
selecting at least one video bitrate-quality point from the first convex hull of points based on the first ladder requirement;
generating at least one bitrate-resolution pair associated with at least one encoded video based on the least one video bitrate-quality point; and
aggregating the at least one bitrate-resolution pair and a plurality of bitrate-resolution pairs generated based on the overall convex hull to generate a portion of the encoding ladder.

6. The computer-implemented method of claim 1, wherein the first convex hull of points includes a first set of video bitrate-quality points, the second convex hull of points includes a second set of video bitrate-quality points, and the overall convex hull includes at least a first subset of the first set of video bitrate-quality points and a second subset of the second set of video bitrate-quality points.

7. The computer-implemented method of claim 1, wherein generating the first convex hull of points comprises:
encoding each shot included in the media title at the same first resolution and across a plurality of encoding parameter sets to generate a plurality of encoded shots;
performing one or more optimization operations based on the plurality of encoded shots and a visual quality metric to generate a plurality of encoded videos; and
computing a plurality of video bitrate-quality points based on the plurality of encoded videos.

8. The computer-implemented method of claim 7, wherein the visual quality metric comprises a video multi-method assessment fusion metric that estimates perceptual video quality.

9. The computer-implemented method of claim 1, wherein the first ladder requirement specifies at least one of a minimum allowed bitrate, a maximum allowed bitrate, a target bitrate spacing, a minimum visual quality level, or a mandatory resolution.

10. The computer-implemented method of claim 1, wherein a bitrate varies across a first encoded video associated with a first bitrate-resolution pair included in the encoding ladder.

11. One or more non-transitory computer readable media including instructions that, when executed by one or more processors, cause the one or more processors to generate encoding ladders for encoding media titles by performing the steps of:
receiving a plurality of encodings of a media title having different resolutions;
generating a plurality of convex hulls of points for the plurality of encodings of the media title, wherein each convex hull of points included in the plurality of convex hulls of points is generated for a different set of encodings included in the plurality of encodings of the media title, wherein each point included in a given convex hull of points represents an encoding included in a given set of encodings having a given same resolution, and the given convex hull of points represents encoding tradeoffs between quality and bitrate when encoding the media title at the given same resolution;
determining an overall convex hull based on the plurality of convex hulls of points; and
generating an encoding ladder for the media title based on at least the overall convex hull and a first ladder requirement.

12. The one or more non-transitory computer readable media of claim 11, wherein the encoding ladder comprises a plurality of bitrate-resolutions pairs that are associated with a plurality of encoded videos.

13. The one or more non-transitory computer readable media of claim 11, wherein the first ladder requirement comprises a quality saturation requirement, and generating the encoding ladder comprises:
computing a quality saturation bitrate based on the overall convex hull;
selecting a first video bitrate-quality point associated with a first encoded video from the overall convex hull based on the quality saturation bitrate;
generating a first bitrate-resolution pair that specifies an average bitrate of the first encoded video and a resolution of the first encoded video; and
aggregating the first bitrate-resolution pair with a plurality of bitrate-resolution pairs associated with at least a second ladder requirement to generate a portion of the encoding ladder.

14. The one or more non-transitory computer readable media of claim 11, wherein generating the encoding ladder comprises:
selecting a plurality of video bitrate-quality points from the overall convex hull based on a target bitrate spacing specified in the first ladder requirement; and
generating a plurality of bitrate-resolution pairs associated with a plurality of encoded videos based on the plurality of video bitrate-quality points.

15. The one or more non-transitory computer readable media of claim 11, wherein generating the encoding ladder comprises:
determining that none of a plurality of video bitrate-quality points in the overall convex hull satisfies the first ladder requirement;
selecting at least one video bitrate-quality point from a first convex hull of points included in the plurality of convex hulls of points based on the first ladder requirement;
generating at least one bitrate-resolution pair associated with at least one encoded video based on the least one video bitrate-quality point; and
aggregating the at least one bitrate-resolution pair and a plurality of bitrate-resolution pairs generated based on the overall convex hull to generate a portion of the encoding ladder.

16. The one or more non-transitory computer readable media of claim 11, wherein determining the overall convex hull based on the plurality of convex hulls of points comprises:
determining a union of video bitrate-quality points included in the plurality of convex hulls of points;
identifying a boundary associated with the union of video bitrate-quality points, wherein no video bitrate-quality point included in the union of video bitrate-quality points is located on a first side of the boundary; and
discarding any video bitrate-quality point included in the union of video bitrate-quality points that is not located along the boundary.

17. The one or more non-transitory computer readable media of claim 11, wherein generating the plurality of convex hulls of points comprises:

encoding each shot included in the media title at a same first resolution and across a plurality of encoding parameter sets to generate a plurality of encoded shots;

performing one or more optimization operations based on the plurality of encoded shots and a visual quality metric to generate a plurality of encoded videos; and computing a plurality of video bitrate-quality points based on the plurality of encoded videos to generate a first convex hull of points included in the plurality of convex hulls of points.

18. The one or more non-transitory computer readable media of claim 11, wherein the first ladder requirement specifies at least one of a minimum allowed bitrate, a maximum allowed bitrate, a target bitrate spacing, a minimum visual quality level, or a mandatory resolution.

19. The one or more non-transitory computer readable media of claim 11, wherein a first encoded video associated with a first bitrate-resolution pair included in the encoding ladder comprises at least a first encoded shot that is generated based on a first encoding parameter and at least a second encoded shot that is generated based on a second encoding parameter.

20. A system comprising:
one or more memories storing instructions; and
one or more processors coupled to the one or more memories that, when executing the instructions, perform the steps of:

receiving a plurality of encodings of a media title having different resolutions;

generating a first convex hull of points for a first set of encodings included in the plurality of encodings of the media title, wherein each point included in the first convex hull of points represents an encoding included in the first set of encodings having a same first resolution based on a visual quality metric and a first plurality of encoded shots associated with both the media title and the same first resolution;

generating a second convex hull of points for a second set of encodings included in the plurality of encodings of the media title, wherein each point included in the first convex hull of points represents an encoding included in the second set of encodings having a same second resolution based on the visual quality metric and a second plurality of encoded shots associated with both the media title and the same second resolution;

determining an overall convex hull based on the first convex hull of points and the second convex hull of points; and generating an encoding ladder for the media title based on a first ladder requirement and at least one of the overall convex hull, the first convex hull of points, or the second convex hull of points.

* * * * *